(12) United States Patent
Croft

(10) Patent No.: US 7,747,951 B2
(45) Date of Patent: Jun. 29, 2010

(54) SYSTEM AND METHOD FOR PROCESSING VERSION CONTENT

(75) Inventor: Lawrence Croft, Burnaby (CA)

(73) Assignee: Eastman Kodak Company, Rochester, NY (US)

( * ) Notice: Subject to any disclaimer, the term of this patent is extended or adjusted under 35 U.S.C. 154(b) by 1158 days.

(21) Appl. No.: 11/364,713

(22) Filed: Feb. 28, 2006

(65) Prior Publication Data

US 2007/0201094 A1 Aug. 30, 2007

(51) Int. Cl.
*G06F 17/00* (2006.01)
*G09G 5/00* (2006.01)

(52) U.S. Cl. .................... 715/276; 715/275; 345/619

(58) Field of Classification Search .......... 715/275, 715/276; 345/619, 629, 634, 636, 637
See application file for complete search history.

(56) References Cited

U.S. PATENT DOCUMENTS

| 6,327,599 B1 * | 12/2001 | Warmus et al. ............. 715/246 |
| 6,421,460 B1 * | 7/2002 | Hamburg .................... 382/162 |
| 6,826,727 B1 | 11/2004 | Mohr et al. |
| 6,950,209 B1 * | 9/2005 | Das ........................... 358/3.01 |
| 2003/0115547 A1 * | 6/2003 | Ohwada et al. ............. 715/511 |
| 2004/0205653 A1 * | 10/2004 | Hadfield et al. ............. 715/530 |
| 2005/0157926 A1 * | 7/2005 | Moravec et al. ............. 382/173 |
| 2006/0041564 A1 * | 2/2006 | Jain et al. .................... 707/100 |
| 2007/0192685 A1 * | 8/2007 | Morales et al. ............. 715/515 |

OTHER PUBLICATIONS

Doug Sahlin, How to Do Everything with Adobe Acrobat 6.0, Published: Jun. 12, 2003, McGraw-Hill/Osborne, p. 146.*
David Blatner, Real World QuarkXPress 6: Macintosh and Windows, Published: Sep. 23, 2003, Peachpit Press, Chapter 3, Section: The Layers Palette, Chapter 13, Section: The Layer Tab, and Chapter 13, Section: The Preview Tab.*

* cited by examiner

*Primary Examiner*—Adam L Basehoar
*Assistant Examiner*—Yasin Patterson
(74) *Attorney, Agent, or Firm*—Donna P. Suchy; Nelson Adrian Blish

(57) ABSTRACT

Systems and methods for processing existing layouts of content comprising common and variant content are described. They involve automatically converting content into a layered version document, checking variant content for conditions which could have an undesirable impact on a rendered image, and automatically modifying variant content to reduce the potential for undesirable impacts on a rendered image.

6 Claims, 25 Drawing Sheets

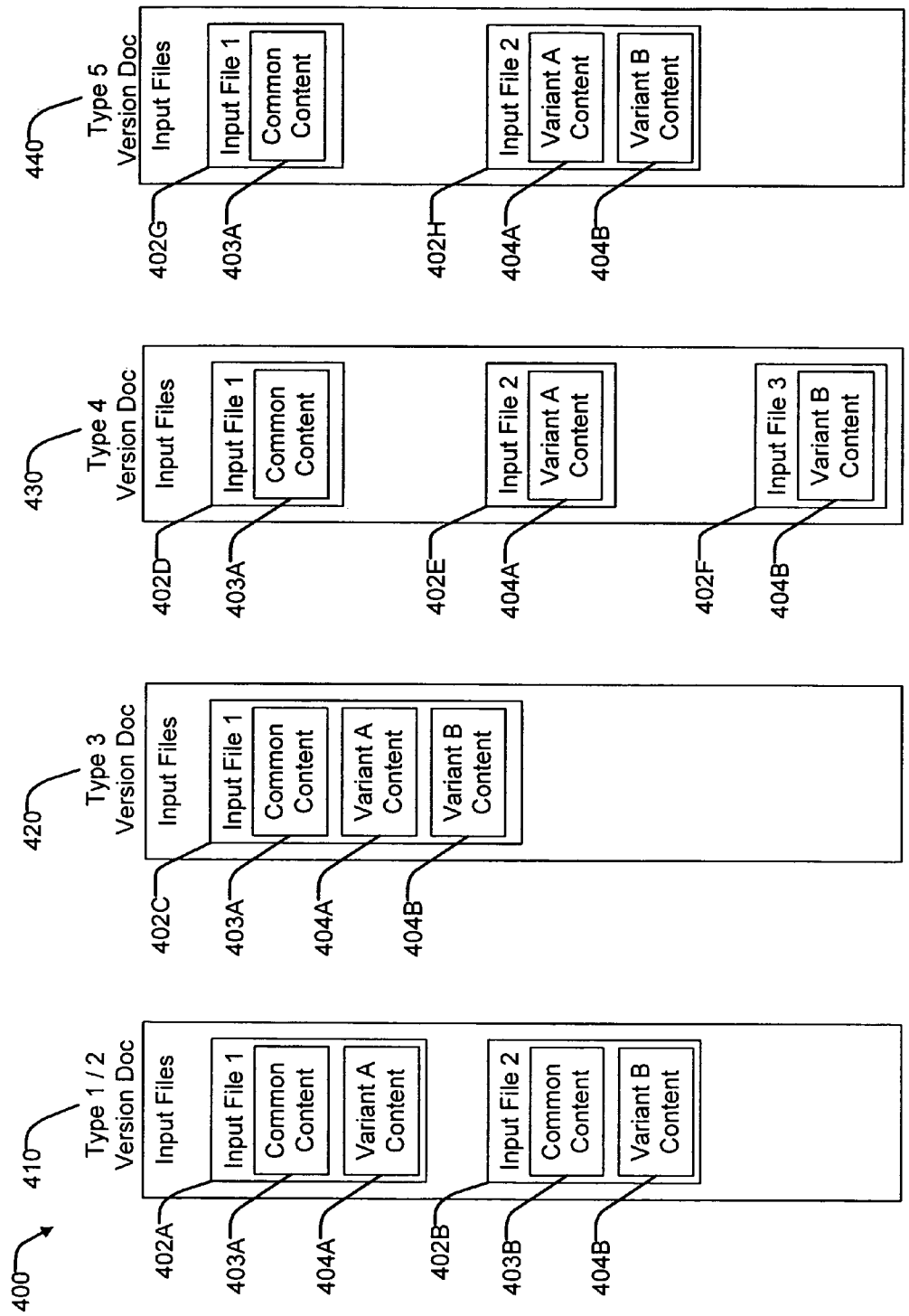

SYSTEM AND METHOD FOR PROCESSING VERSION CONTENT

FIELD OF THE INVENTION

This invention pertains to producing and printing documents that have some content that varies by region, language or other criteria. More specifically, the invention pertains to document processing that includes checking variant content for conditions that could have an undesirable impact on a rendered image produced from the content and automatically modifying variant content to reduce those impacts.

BACKGROUND OF THE INVENTION

Printing of version documents is well known in the graphic arts industry. A version document is one that has some content that varies by audience. For example, printing different versions of a magazine could involve varying (altering or substituting) content for different audiences based on economic, demographic, linguistic or other differences.

An image of a specific version (e.g. a selection of common and at least one variant's content) of a version document can be produced using a variety of methods that include three main activities. First, one or more artwork documents are produced that include the common and variant content. Then, the artwork design is converted to a printable format (e.g. Adobe® PostScript® or Adobe® PDF) in a version document. Finally, an image for a specific version is produced from the version document. A version document can include one or more files or streams of data corresponding to different compositions of the printable common and variant content.

A creative design software application, exemplified by Adobe® Illustrator® or QuarkXPress™, can be used by a creative artist to develop the common and variant content in an artwork document. This can include producing separate artwork document files for each specific version wherein the variant content is modified in each file. Alternatively, one layered artwork document can be produced with common content defined on one layer and variant content defined on one or more layers. As another alternative, variant content can, in some creative applications, be defined with attributes to distinguish it from other content in the same file. For instance, an artist can define variant content using color aliases (e.g. Black-English to represent English-specific content painting in black ink).

Producing a version document by converting an artwork design to a printable format can be accomplished by converter software associated with a print function incorporated in the creative design software application or it can be performed by an external software application that operates on a format produced by the creative design software application. For exemplary printable formats such as Adobe® PostScript® and Adobe® PDF, printable elements are generated with a painting order based on a painting order defined by artwork elements of the artwork document. Painting order in an artwork document can be based on an order defined by the artist, either implicitly by the order in which artwork elements were created, or explicitly by specific ordering actions (e.g. bring to front) applied to artwork elements. In addition, artwork elements defined for a layer can have a relative order with respect to artwork elements defined for another layer (e.g. elements of a first layer paint before elements of a second layer).

Problems often occur during the version document production process and subsequent image production process whereby an image for a specific version produced is inconsistent with the artist's intent. This can occur if the artist does not understand or consider how the artwork content, especially the variant content, will be converted to a printable format (e.g. version document) or if the artist does not understand or consider how the processing of the version document to produce an image for a specific version occurs. An unintended result of processing may be undesirable (e.g. a significant color variation) or may be acceptable (e.g. a minor color variation). Thus there is a need to determine whether variant content could have an unintended, and in particular, undesirable impact on a rendered image produced by processing the version document.

Prior art methods of processing version documents often use a raster workflow. Rendering high-resolution image data for specific versions could occur relatively early in a raster workflow. By examining common and variant image data color separations, one could identify undesirable images before printing occurred and appropriate revisions in the document or process could be made.

In contrast, vector workflows can allow high resolution rendering to be deferred. This has the benefit of reducing re-processing activities if late changes are made to the original artwork or version documents. However, timely detection of aforementioned version content problems has been less effective in these vector workflows.

Attempts to reduce the occurrence of these problems in the prior art include producing specific types of version documents and using particular processing methods. For example, a version document having common and variant content composed in separate files could be less susceptible to rendering problems if the content was processed separately and the resulting color-separated image data composited (e.g. multiple exposure with different raster) to give an intended result. This solution requires multiple files to be produced and maintained. In contrast, a version document with another composition (e.g. single file) could require that common and variant content be rendered together to produce the image data. Predefined rendering rules applied to the painting ordered content elements of a single file could produce undesirable results (e.g. a variant element painting later could unintentionally knock out part of an already painted common element).

However, producing a version document, consisting of a single file comprising common and variant content, is desirable because it is simpler to manage in a workflow. Thus, it is desirable to utilize a single file version document in a vector workflow with the ability to easily check variant content for conditions that could produce an undesirable rendered imaged. Further, it is desirable to be able automatically modify variant content to reduce its potential for producing an undesirable rendered image.

SUMMARY OF THE INVENTION

The invention provides systems and methods for processing common and variant content derived from at least one artwork document in a vector workflow.

One aspect of the invention provides for checking variant content to determine whether it could produce an undesirable rendered image. An undesirable image may be one that is inconsistent with the artist's intent, the print buyer's intent, or the printer's intent. The content can be obtained directly from a layered artwork document, from a version document produced from at least one artwork document, or from a layered version document produced from at least one artwork document or a version document. For clarity, hereinafter, content means artwork elements or printable elements, derived from artwork elements.

An additional aspect of the invention provides for converting content from a document, including one or more files, into a layered version document. Converting can include merging content elements to retain a relative painting order of content elements from the document. Converting also includes associating each content element with a layer of the layered version document. The document layers include a common layer and a plurality of variant layers corresponding to the plurality of variants.

An additional aspect of the invention provides for adding content to a layered version document to facilitate visually checking variant content to determine whether it could produce an undesirable rendered image. For example, when a preview image is rendered for a specific version of the layered version document, added elements enable a user to easily recognize variant content affecting common content.

Another aspect of the invention provides for automatic modification of variant content to reduce its potential for producing an undesirable rendered image. This can include reconfiguring variant content to refrain from painting in colors intended only for common content. Modification can include reconfiguring all variant content to overprint instead of knockout. As another example, modification can also include configuring variant content so that its rendering only affects a pixel intensity value for a color if its intensity is darker than a pixel intensity determined by content configured to paint earlier. This provides a similar result to raster workflow methods of compositing image data rendered from pre-separated common and variant content.

In a preferred embodiment of the invention, a document converter processes content to provide a layered version document with a reduced potential for producing an undesirable rendered image. Additionally, a raster image processor (RIP) provides for rendering a specific version of a layered version. Further, an image preview application provides the ability to visually inspect the rendered image data to check for an undesirable image.

Other embodiments can include some combination of the aforementioned aspects, incorporated in a creative application, a document converter application or a document preview application.

BRIEF DESCRIPTION OF THE DRAWINGS

FIGS. 4A-4D illustrate exemplary types of version document compositions according to the invention.

DETAILED DESCRIPTION OF THE INVENTION

Figure 1:
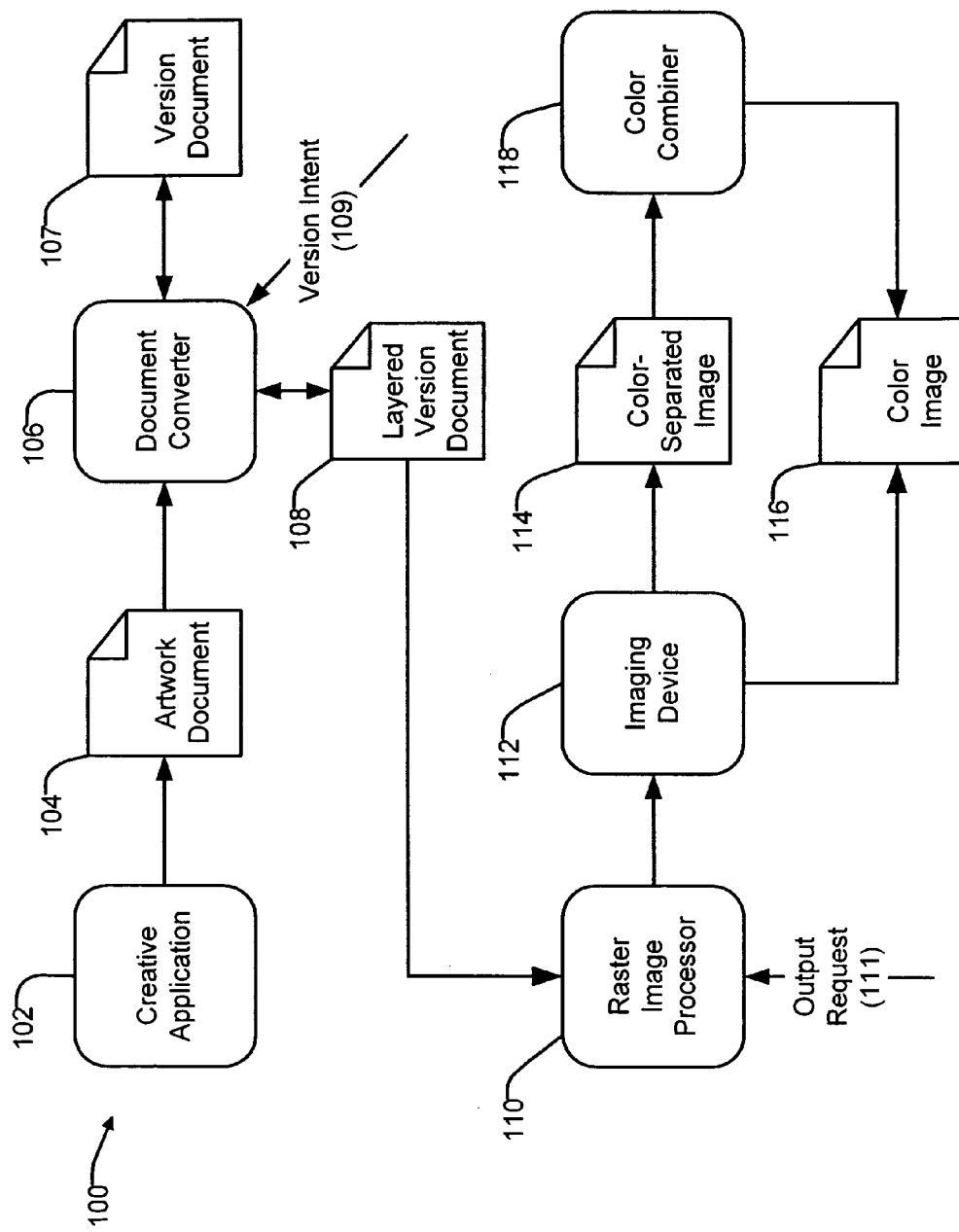
FIG. 1 is a functional block diagram of a computer-based system according to the invention.

FIG. 1 is a functional block diagram of a computer-based system according to the invention. Functions can be performed by one or more computers located at one or more locations. Some functions can be performed automatically according to pre-defined rules or at the direction of a user.

Creative Application

A creative application 102, generally defined as an application that generates or operates on some sort of multi-media content, like image, text, artwork, and/or other content, to produce an artwork document 104. For clarity, hereinafter, content means artwork elements or printable elements, derived from artwork elements. A creative artist typically utilizes creative application 102 on a desktop computer to capture a representation of an artistic concept. Adobe® Illustrator® is an example of the creative application 102 and is well known for capabilities suited to preparing a single page advertisement (or other types of artistic work) that has both common and variant content. Hereafter creative application 102 will be interchangeably referred to as application 102.

The artwork document 104 comprises one or more files or streams of data accessible to a computer system and corresponding to a representation of an artistic concept. Data representing the concept includes data defining vector (e.g. path, text) and/or raster (e.g. image) artwork or other elements configured to paint in a particular painting order, each with a configurable imaging intent (e.g. knockout, overprint, or transparency). For clarity, the remaining detailed description describes the invention in the context of an artwork document 104 including common and variant artwork elements organized on separate layers. The invention can accommodate other artwork organizational models as well as will be understood by those skilled in the art.

Document Converter

A document converter 106 includes software or other logic designed to convert artwork document 104 into a printable format. Printable formats include printable elements defined with a painting order determined, at least in part, from the painting order of artwork elements of the artwork document 104. Preferred printable formats include Adobe® PostScript® and Adobe® PDF but other formats specifying elements painting in an order can be compatible with the invention.

Converter logic can be incorporated in application 102 and can be associated with a print or other function of application 102 to print a selection of common and/or variant content. Document converter 106 can also include logic separate from application 102, capable of reading artwork document 104 or another format produced by application 102. Composite converter logic, including logic incorporated in application 102 and separate logic, can exist in some embodiments. For example, artwork document 104 can be converted by incorporated converter logic to produce printable version document 107. Version document 107 can then be converted by separate logic to form layered version document 108. Alternatively, converter logic, either incorporated in or separate from application 102, can directly convert artwork document 104 into layered version document 108. Another exemplary alternative includes document converter logic producing a basic layered version document 108 which can then be subsequently converted, according to aspects of the invention, into a preferred layered version document 108.

Version document 107 can include documents with a variety of compositions, as exemplified in FIG. 4A-4D, and described further below. In a preferred embodiment, document converter 106 produces a layered version document 108 with each printable element associated with either a common or variant layer according to the artist's version intent 109.

Version intent 109 includes information about content and how to combine the content to produce specific versions. Version intent 109 can include a set of one or more colors to be painted only by common content. Production costs for version documents may be reduced by increasing the number of common colors (e.g. fewer versioned printing plates for lithographic printing).

Version intent 109 can also include information about the plurality of variants to be incorporated in layered version document 108. For example, the plurality of variants may include English, French, Spanish, US, and Canadian variants.

Version intent 109 can also include additional information describing how to produce a specific version (e.g. Quebec version) from a set of content (e.g. Common, French and Canadian). An exemplary method for specifying versions from content is to produce a table where rows correspond to intended versions and columns correspond to layers (e.g. common and variants). For each intended version (row), a Boolean "true" value in a table cell, corresponding to a layer (column), dictates that this layer is to be selected when producing that version. A Boolean "false" value indicates that the layer is not selected when producing that version.

In a preferred embodiment, converter logic includes logic to help check variant content to determine whether it could produce an undesirable rendered image. An undesirable image may be one that is inconsistent with the artist's intent, the print buyer's intent, or the printer's intent. For example, a first conversion can examine the configuration of variant content elements to see if any elements violate various potentially undesirable conditions. If any elements are identified, the elements and/or the conditions can be made available to a user or can be handled automatically.

An exemplary undesirable condition is a variant content element configured to paint a color intended to be painted only by common content. This is likely undesirable unless, for example, the element paints in an area to be trimmed during production. Another exemplary undesirable condition is variant content configured to paint with knockout intent. This may be undesirable, for example, if different variants paint to knockout color in the same area and they paint with an intended common color. In this scenario, each variant may knockout different areas of common color, based on the configuration of the variant elements. Thus, it is likely that no common color separation can be generated that will work well with all of the variants. Other undesirable conditions may be detectable either through visual or automated inspection of content or renderings of content.

Making potentially undesirable conditions available to a user can include reporting them during or after conversion. Alternatively, the undesirable condition detected for a variant content element can result in the content element being associated with an "error" layer in layered version document 108 so that the user can visually inspect the element in a preview image. If the error is significant, the user can remedy the condition through a variety of means. For example, reconverting version document 107 with different settings for automatic modification of variant content may resolve the problem. Alternatively, manually correcting layered version document 108 or an ancestor document (e.g. artwork document 104 or version document 107) may resolve the problem. Various combinations of manual conversion and/or reconverting can occur. If the undesirable condition is not significant, the existing layered version document can be used without correction.

Sometimes, undesirable rendered images caused by variant content may be most easily identified through visual inspection (e.g. in a preview image). Converter logic can automatically configure additional layers in layered version document 108, based on the variant layers, as a means of identifying variant content impacts on a rendered image. In particular, an anti-variant layer, corresponding to each variant layer, can be created. An anti-variant layer can be configured to be automatically selected in a preview image when the corresponding variant layer is deselected. Copies of each original variant element, configured with knockout intent and associated with a variant layer, can be configured to paint before the original element and can be associated with its corresponding anti-variant layer and can be configured to paint only in common colorants and with zero intensity (e.g. an absence of color) and with overprint intent. Such a resulting element can be considered a variant anti-element of the original variant element since it paints in a preview image only when the corresponding variant element does not paint. With this aspect, undesirable impacts of knockout variant elements on common color separations can be visually inspected (e.g. a common color separation may contain zero-intensity areas caused by selected anti-elements). In some embodiments, an anti-layer can be conceptually created without actually creating a separate layer. For example, an anti-element can be associated with the common layer and can be associated with information that determines when it should be painted (e.g. when the corresponding variant layer is not selected).

In another preferred embodiment, converter logic also includes logic to automatically modify variant content to reduce its potential for producing a rendered image with undesirable appearance. Automated modification can occur based on predefined settings or settings provided as input to document converter 106. Rules can be triggered based on the settings and/or by automatic detection of undesirable conditions. For example, one rule can dictate that any variant element painting a color intended only for common content is to re-configured to refrain from painting in that color. Similarly, a setting can control whether that rule will be followed. Another exemplary rule can dictate that variant content configured to paint with a knockout intent is re-configured to paint with an overprint intent. Another exemplary rule can dictate that all variant content is to be re-configured for transparency processing to blend color for content with content that paints earlier using a darken blend mode function. Preferably, common content is not modified or is not substantially modified in order to retain the artist's original intent.

For transparency processing, document converter 106 groups all variant content elements, configured to paint in succession, in a transparency group configured with a darken blending mode function while preserving the painting order and layer association for the grouped elements. This achieves a result that is similar to that achieved by compositing in a raster workflow.

Layering and transparency imaging models are well known in the prior art. As an example, current versions of Adobe® Illustrator® supports both layering and transparency but the application operates in a manner that is inconsistent with the invention. Experiments show that elements originally defined on different layers are associated, upon grouping, with the highest layer having an association amongst the grouped elements. For example, in a document where some elements are associated with a first layer and different elements are associated with a second layer, when the elements are grouped they are associated with the second layer. Additionally, transparency grouping is commonly motivated by achieving a visual effect in regions where elements that paint together overlap. The invention instead groups variant content elements (including variants that may not paint together in an image for a specific version) only if they paint in succession and without regard to their spatial orientation.

In some embodiments, document converter 106 can produce layered version document 108 with multiple common layers and sets of variant layers each corresponding to one or more of the common layers. This can be used, for example, when common content may include a photographic image that must vary for different audiences.

Raster Image Processor

Raster image processor 110 comprises a rendering engine and output control logic. The rendering engine, according to the invention, is operative to render layered printable documents: defining content elements configured for transparent imaging. This is exemplified by rendering engines supporting Adobe® Portable Document Format version 1.4 (or later versions), currently available at http://partners.adobe.com/public/developer/pdf/index reference.html#5.

Output control logic, according to the invention, is operative to control a rendering of layered version document 108 to produce an image for a specific version. It can accomplish this, for example, by selecting layers of layered version document 108 so that content elements associated with the selected layers are rendered to produce an image for a specific version. Output control logic selects layers, for example, by obtaining an output request 111 identifying the layers to be selected. This can be accomplished, for example, based on version intent 109 described above.

Raster image processor 110 can produce color-separated raster image data, having a plurality of (continuous tone or halftone) pixel intensity values, for each color defined by a color space of target imaging device 112 based on the color configured for a selected set of content elements. The CMYK colors are common for printed output while RGB colors are common for display devices. Other colors, defined by a color space associated with target imaging device 112 can also be supported. Rendering can include mapping colors configured for content elements (e.g. RGB colors) into a color space (e.g. CMYK colors) for target device 112. Raster image processor 110 can determine the correct target color intensity value at each pixel location based on pre-defined rendering rules configured for raster image processor 110 and color attributes configured in layered version document 108.

Blending color for transparency groups (e.g. in a RIP) is well known in the art. In summary, a color intensity value for a transparency group of elements can be blended with a color intensity value from its backdrop (e.g. a color intensity determined by content elements defined outside the group and painting earlier in the painting order). Blending based on a darken function can cause the darkest intensity value, of the values to be blended, to be selected. A transparency group's color intensity value can be determined by the configuration of its grouped content elements. For example, grouped variant content elements configured to paint with knockout intent, result in a group color intensity value for a pixel location that is based on the grouped element that paints last at the pixel location. Thus, in an example of the invention, grouped variant elements only affect color intensity at a pixel location if their grouped color intensity is darker than the intensity of their backdrop (e.g. earlier painting common elements).

Target Imaging Device

Color-separated image data is provided as input to target imaging device 112, which can produce color image 116 or color-separated image 114. Color image 116 can include a color display, inkjet proof or other color image produced directly by target imaging device 112. Color-separated image 114 can include raster or film or printing plates or other items suitable for use by color combiner 118 to produce color image 116. Lithographic, flexographic and gravure printing presses are examples of color combiner 118. Another example of color combiner 118 is an image preview application.

Certain implementations of the invention comprise computer processors, which execute software instructions, which cause the processors to perform a method of the invention. For example, document converter 106 can be implemented by providing software which runs on one or more computer systems and causes the computer systems to operate according to the methods described above. The program product may comprise any medium which carries a set of computer-readable signals including instructions which, when executed by a computer processor, cause the computer processor to execute a method of the invention. The program product may be in any of a wide variety of forms. The program product may comprise, for example, physical media such as magnetic storage media including floppy diskettes, hard disk drives, optical data storage media including CD ROMs, DVDs, electronic data storage media including ROMs, flash RAM, or the like or transmission-type media such as digital or analog communication links. The instructions may optionally be compressed and/or encrypted on the medium.

Detailed Example

The remaining description details an example of common and variant content and illustrates various aspects of the invention described above. In particular, the aspect of transparency processing is detailed below.

Figure 2:
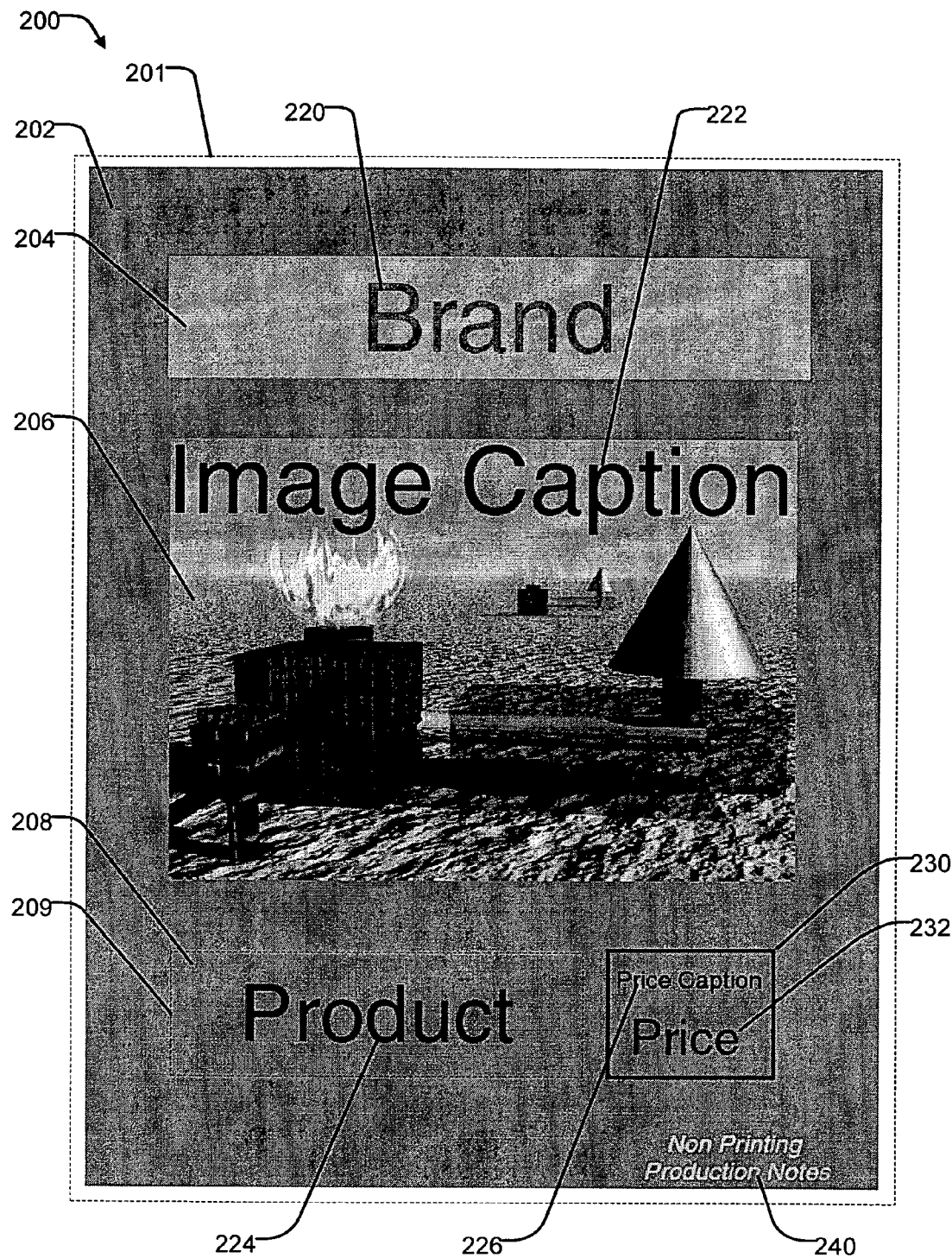
FIG. 2 illustrates an exemplary conceptual layout for a versioned page according to the invention.
Figure 3A:
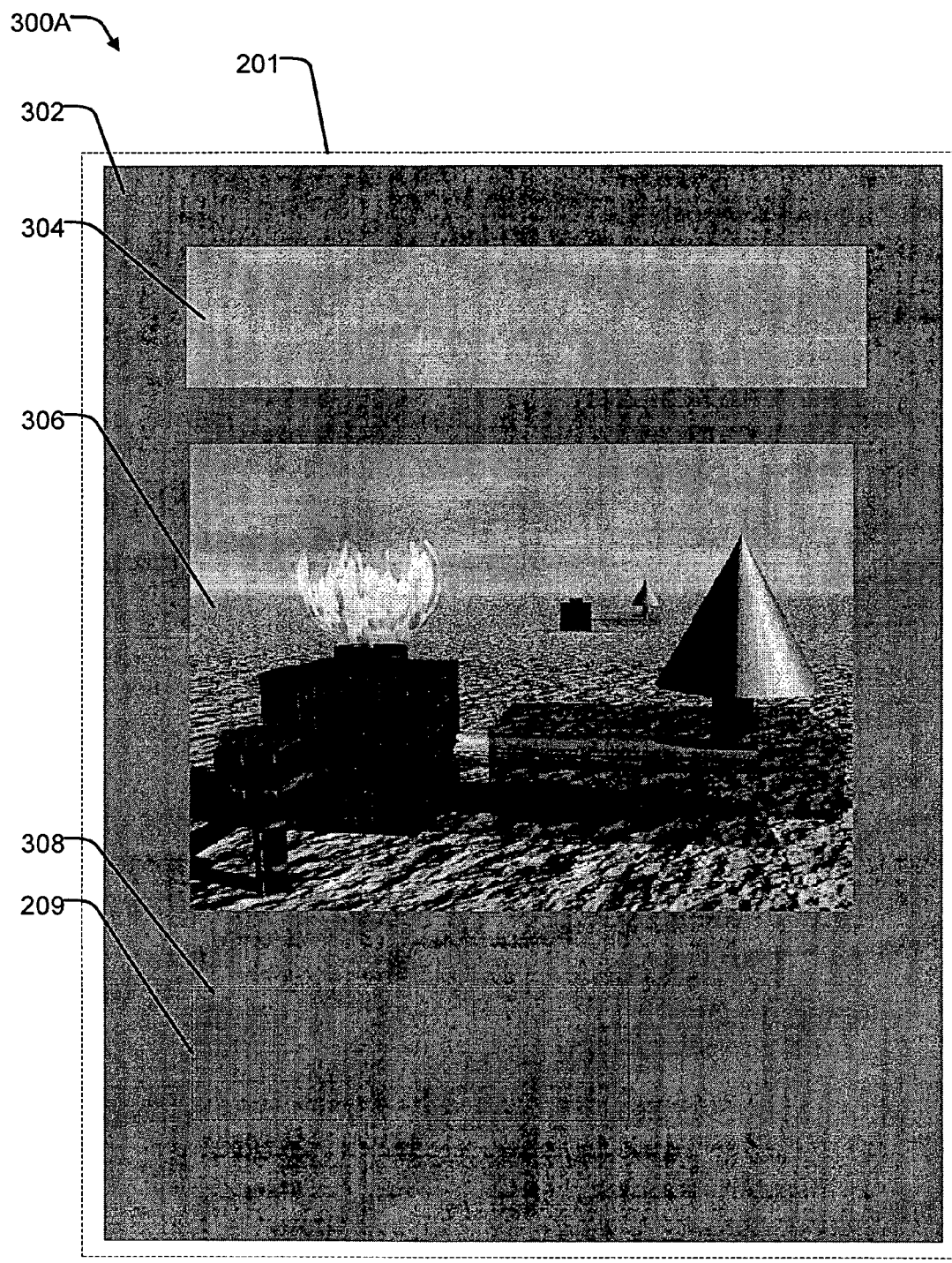
FIGS. 3A-3E illustrates a page layout of common and variant artwork elements of an exemplary artwork document according to the invention.
Figure 3B:
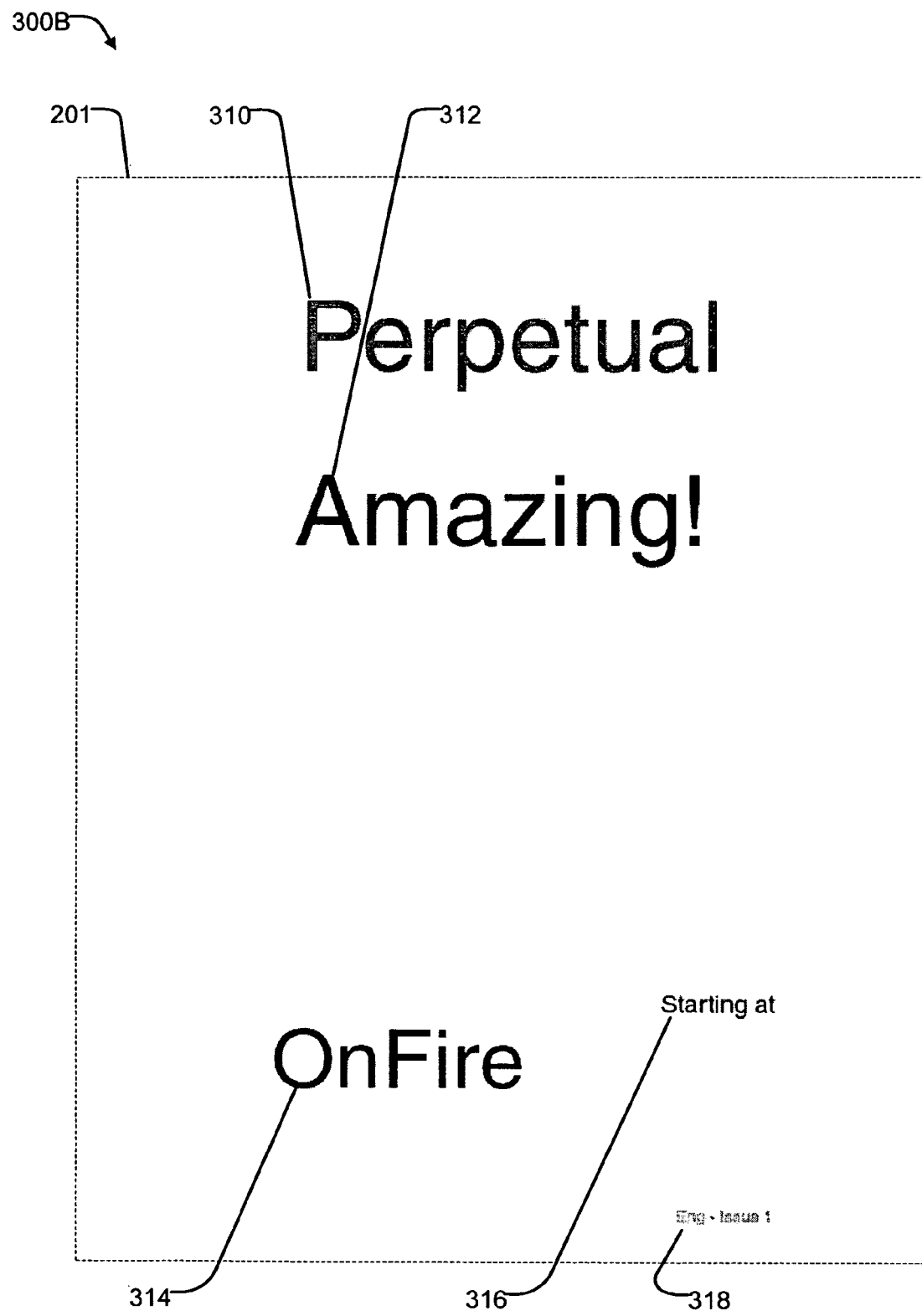
Figure 3C:
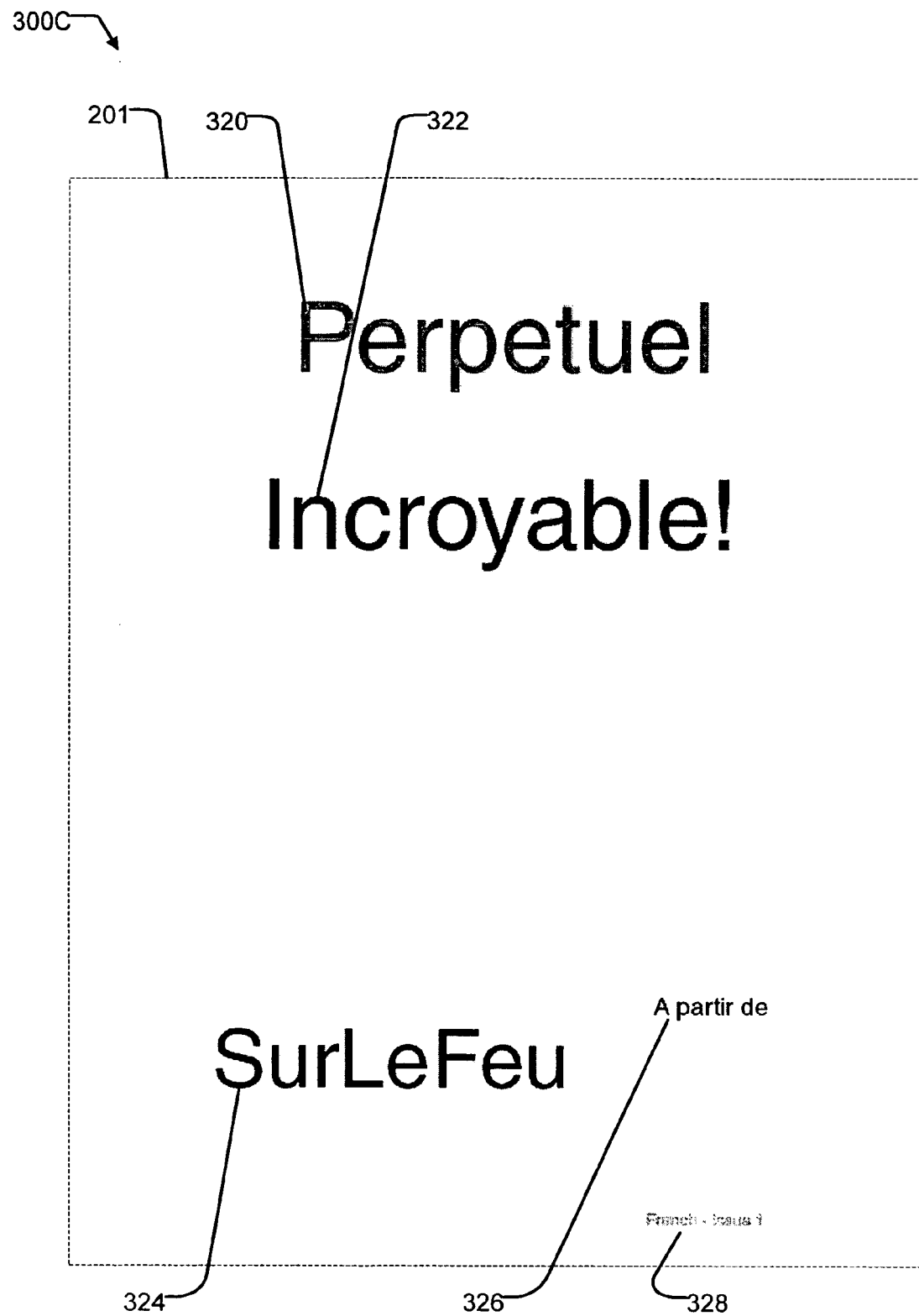
Figure 3D:
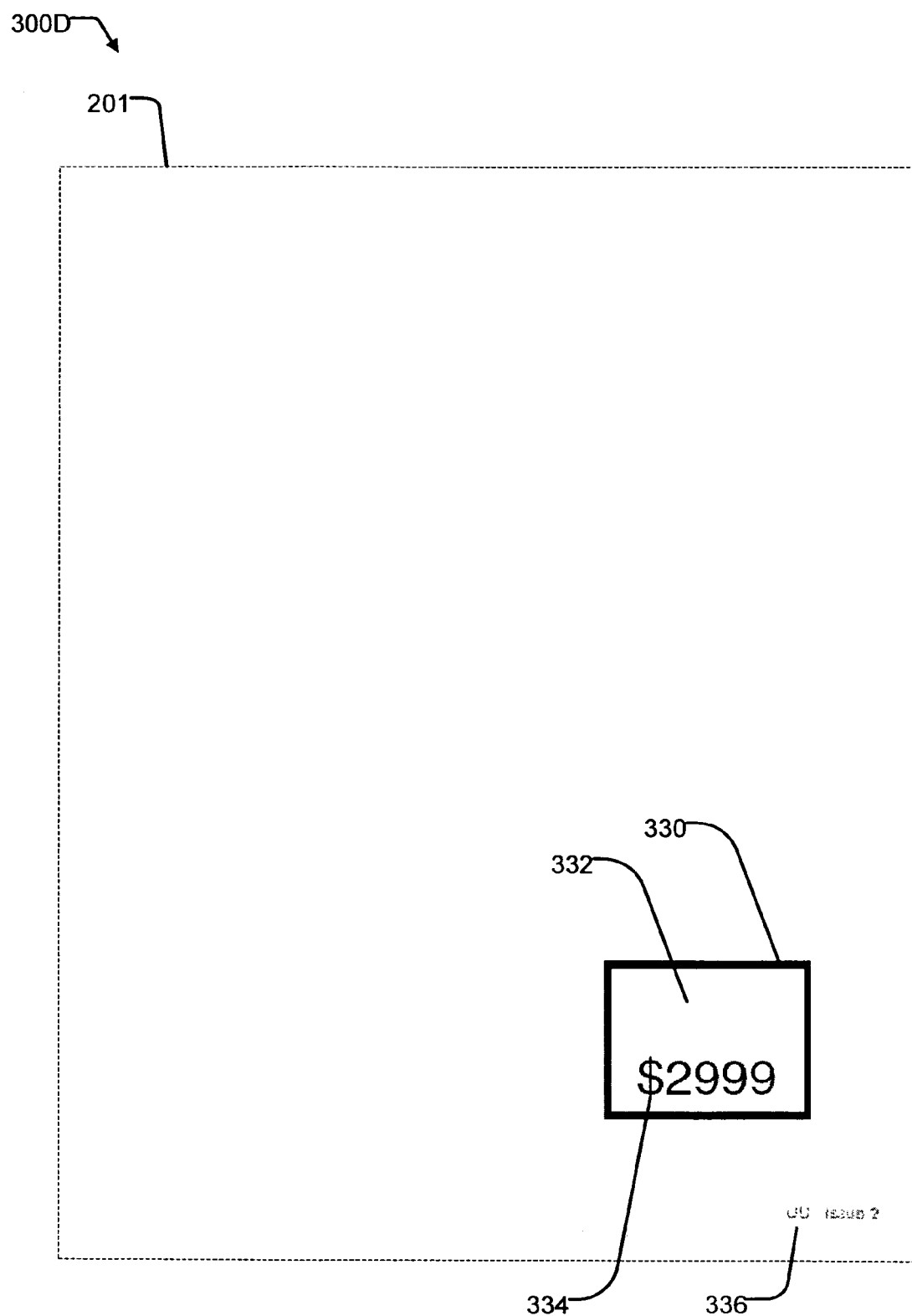
Figure 3E:
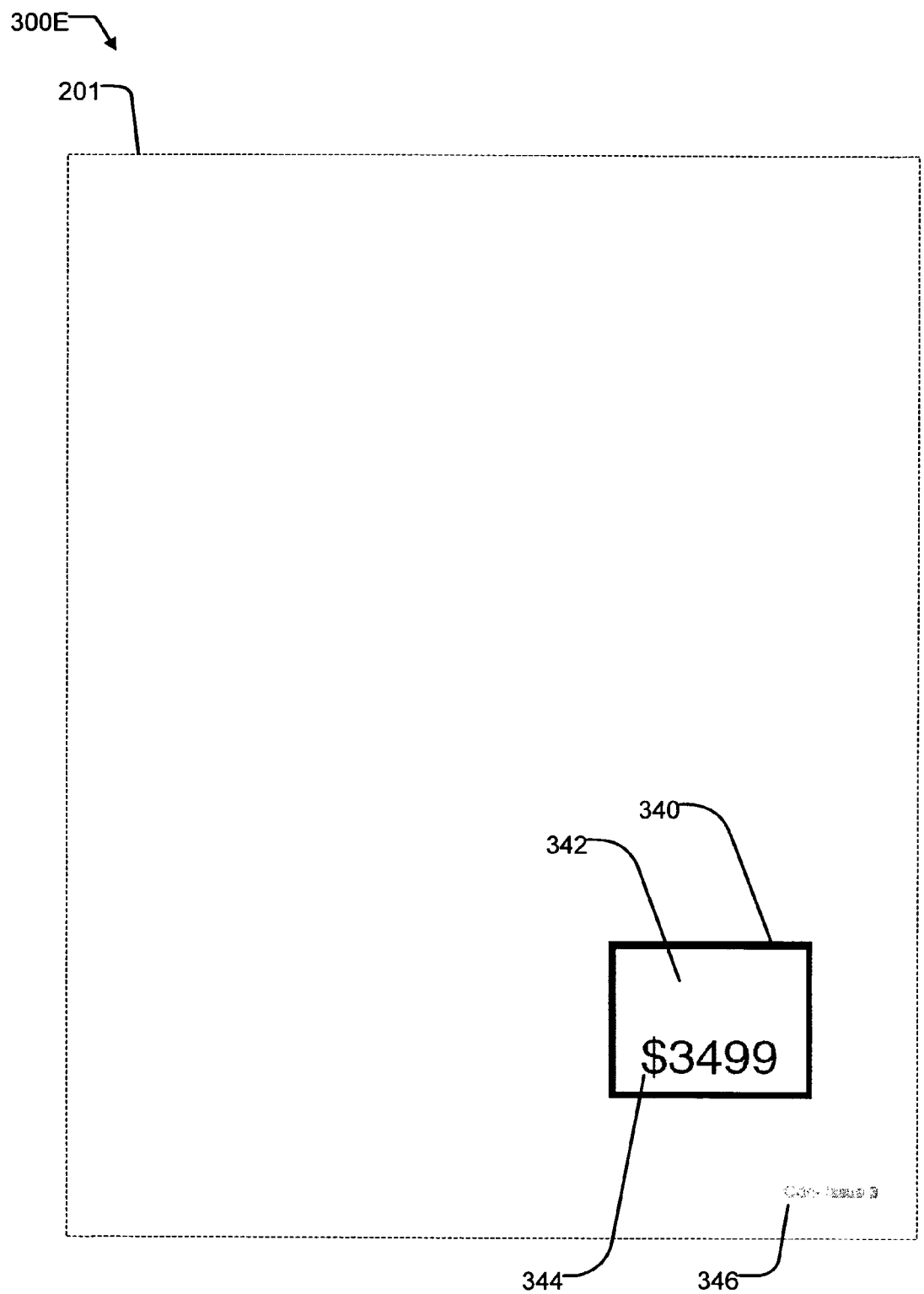

FIG. 2 illustrates an exemplary conceptual layout 200 for a versioned advertisement page according to the invention. Conceptual layout 200 can be used to illustrate aspects of the invention. Conceptual layout 200 represents the concept that the creative artist intends. Some elements of conceptual layout 200 are common amongst each specific version that the artist intends to produce. Conceptual layout 200 also includes variant elements for different languages and countries. In this example, four variants, corresponding to the two language and countries, are defined, including: English, French, US and Canada. Exemplary specific versions include the following combinations: Common+US+English, Common+Canadian+English, and Common+Canadian+French.

Box 201 represents a page boundary for artwork elements associated with conceptual layout 200. Page background 202 represents a common rectangular background fill color of 30% neutral gray for the advertisement. Brand background 204 represents a common rectangular background fill of a specific CMYK color for the brand name of the advertised product. Product image 206 represents a common picture of the advertised product of varying color. Product name background 208 represents a common rectangular background fill color of saturated cyan for the advertised product name. Box 209, which is not part of concept 200, is included to clarify the boundary of product name background 208. When FIG. 2, a color image, is printed or displayed as a grayscale image, it may otherwise be difficult to distinguish product name background 208 from background 202.

Brand 220 represents variant brand name text of a specific MY color. Image caption 222 represents variant caption text of saturated black color for product image 206. Product 224 represents variant product name text of saturated black color. Price box 230 represents a variant stroked box of saturated black color with no fill defined similarly for both US and Canadian variants to spatially encapsulate: price caption 226 representing variant caption text of saturated black color; and product price 232 representing variant price text of saturated black color. Non-printing production notes 240 represents variant production notes text of 10% neutral gray color. Notes 240 can be used to identify variant content in image data but can be configured so that the image data will not contribute color in any version-specific image (e.g. notes 240 are configured with lighter colors than common page background 202).

From conceptual elements 202-240, it could be determined that cyan is intended as the only common color. This or another color intent could be expressed in version intent 109.

FIGS. 3A-3E illustrate layouts of common and variant artwork elements of an exemplary artwork document 104 according to the invention. Artwork layouts 300, illustrated in FIGS. 3A-3E, includes artwork elements corresponding to referenced items in concept layout 200. Common artwork elements include filled path elements: 302, 304 and 308; and image 306. English artwork elements include text elements: 310, 312, 314, 316 and 318. French artwork elements include text elements: 320, 322, 324, 326 and 328. US artwork elements include text elements: 334 and 336. US artwork elements also include filled path elements: 330 and 332. Canadian artwork elements include text elements: 344 and 346. Canadian artwork elements also include filled path elements: 340 and 342. All elements are configured to knock out color painted earlier.

An artwork layout or a content layout, derived from an artwork layout, includes an explicit arrangement of specific content elements corresponding to a more abstract concept layout. For simplicity, hereinafter, the term layout refers to an artwork layout or content layout.

In the case of elements 330 and 332, a black stroked path with no fill is simulated by smaller path 332 configured to paint a white fill on top of larger path 330 configured to paint a black fill. Although price box 230 can be achieved by a single artwork element consisting of a black stroked path with no fill, experience with converters incorporated in various creative applications shows that content elements produced from one artwork element can take on different but visually similar representations in a printable format. Artwork elements 330 and 332 are examples of different but visually similar representations that could be produced from a single stroked path with no fill. This exemplifies an undesirable rendered image that can go undetected without the invention since the artist may not understand the substitution that occurs during converting.

FIGS. 4A-4D illustrate exemplary types of version document compositions produced by document converter 106 according to the invention. Different version document types are illustrated. Additional types may be possible that are compatible with the invention.

Type 1/2 version documents 410, as shown in FIG. 4A, are characterized by multiple files 402A-402B with each file 402 having common content 403 and variant content 404 for one variant. Files 402A-402B can be created, for example, by enabling only the common and one variant layer in creative application 102 before printing. Alternatively, for example, version documents 107 can be produced from separate artwork document 104 files wherein each artwork document 104 is a modification of an original with common content 403.

Type 1 can be distinguished from Type 2 by the colors configured for variant content 404. For Type 1, variant content 404 is configured with colors that are distinguishable from common content 403. For example, common content 403 is configured to paint CMYK colors while variant content 404 is configured to paint a spot color. During rendering, spot colors can be mapped to CMYK or other target colors to achieve the desired variant color in color image 116. Type 2, by contrast, can configure variant content 404 with a subset of colors used by common content 403.

Converting Type 1/2 version documents 410 into layered version document 108 can be challenging. For example, common content in artwork document 104 can inadvertently be altered between production of version document file 402A and 402B. One of common content 403A and 403B is probably correct but determining that a problem exists and correcting it can be a challenge. Further, producing layered version document 108 with a single painting order of content elements from the combination of content elements from multiple version documents 107 can be a challenge. U.S. patent application Ser. No. 11/129,349, entitled "System and methods for comparing documents containing graphic elements", and filed May 16, 2005, describes methods for comparing and merging version documents 107. It is incorporated herewith by reference. Once content 403A-403B and 404A-404B is merged with correct painting order and variant content identified, converting according to methods of the invention can be accomplished. This can include one or more of the following conversion aspects: creating layers for common and variant content; mapping content element colors to target colors; associating merged content elements with layers; modifying variant content to refrain from painting colors intended only for common colors, modifying variant content to paint with an overprint intent; and grouping all variant content elements that paint in succession in a transparency group configured to use a darken blending mode function.

Type 3 version documents 420, as shown in FIG. 4B, are characterized by a single file 402C having common content 403A and all variant content 404A-404B. As an example, file 402C distinguishes common content 403A from variant content 404A-404B by colors configured for the content. For instance, common content 403A can be configured for CMYK colors while variant content 404A-404B can be configured with different spot colors for each version. Converting a Type 3 version document 420 into layered version document 108 can be accomplished by one or more of the conversion aspects described above.

In one preferred embodiment, converting document 420 preserves the painting order from file 402C in layered version document 108 and associates content with layers based on the content's distinguishing characteristic (e.g. configured color). Type 4 version documents 430, as shown in FIG. 4C, are characterized by multiple files 402D-402F. Each file 402 comprises only one type of content. In one preferred embodiment, converting document 430 into layered version document 108 includes merging variant content 404A and 404B in the painting order after the common content 404A paints and performing one or more of the additional conversion aspects described above. In one preferred embodiment, converting also preserves the relative painting order of content within each file 402. For example, in layered version document 108, variant content 404A paints after common content 403A but content from each paints with a relative order defined by corresponding files 402E and 402E.

Type 5 version documents 440, as shown in FIG. 4D, are characterized by multiple files 402G-402H. File 402G comprises common content 403A while file 402H comprises all variant content 404A-404B. Variant content 404A can be distinguished from variant content 404B by configured colors, layer associations or other means. Converting comprises techniques similar to those described above for Type 4. When converting document 440 it is preferred to have a painting order in layered version document 108 based on the painting order from document 440. In one preferred embodiment, painting order in layered version document 108 includes common content 403A painting before variant content 404A and 404B. In one preferred embodiment, converting also preserves the relative painting order of content within each file 402.

In some embodiments, converting normally performed for one document type can be used for document type. In this case, for example, files can be pre-processed so that their resultant organization is consistent with another document type. As an example, a Type 2 document can be converted using the methods normally used for Type 4 documents. This may be useful if it is desired to force common content 403A to be selected from one file (e.g. file 402A) instead of identifying content that is truly common amongst files 402A and 402B. In this case, file 402A is first processed to distinguish common content 403A from variant content 404A on the basis of configured color. Common content 403A can be identified as content configured to paint colors intended only for common content. The remaining content is presumed to be variant content 404A. The result of preprocessing file 402A is similar to files 402D and 402E. Then, file 402B is processed to select only variant content 404B with a result similar to 402F.

FIGS. 5A-5E illustrate a set of exemplary black image data 501 produced by separately rendering common and variant content elements of version documents 107 according to prior art raster workflows. A selection of the set of black image data 501 could be combined to create color-separated image 114 or part of color image 116. Combining could be accomplished, for example, by compositing logic or by exposing the same media first with common image data 501A and then with one or more variant image data 501B-501E. For halftone rendering, the result would be that a pixel is painted because either or both a common content element or a selected variant element were configured to paint the color at the pixel location.

Figure 5A:
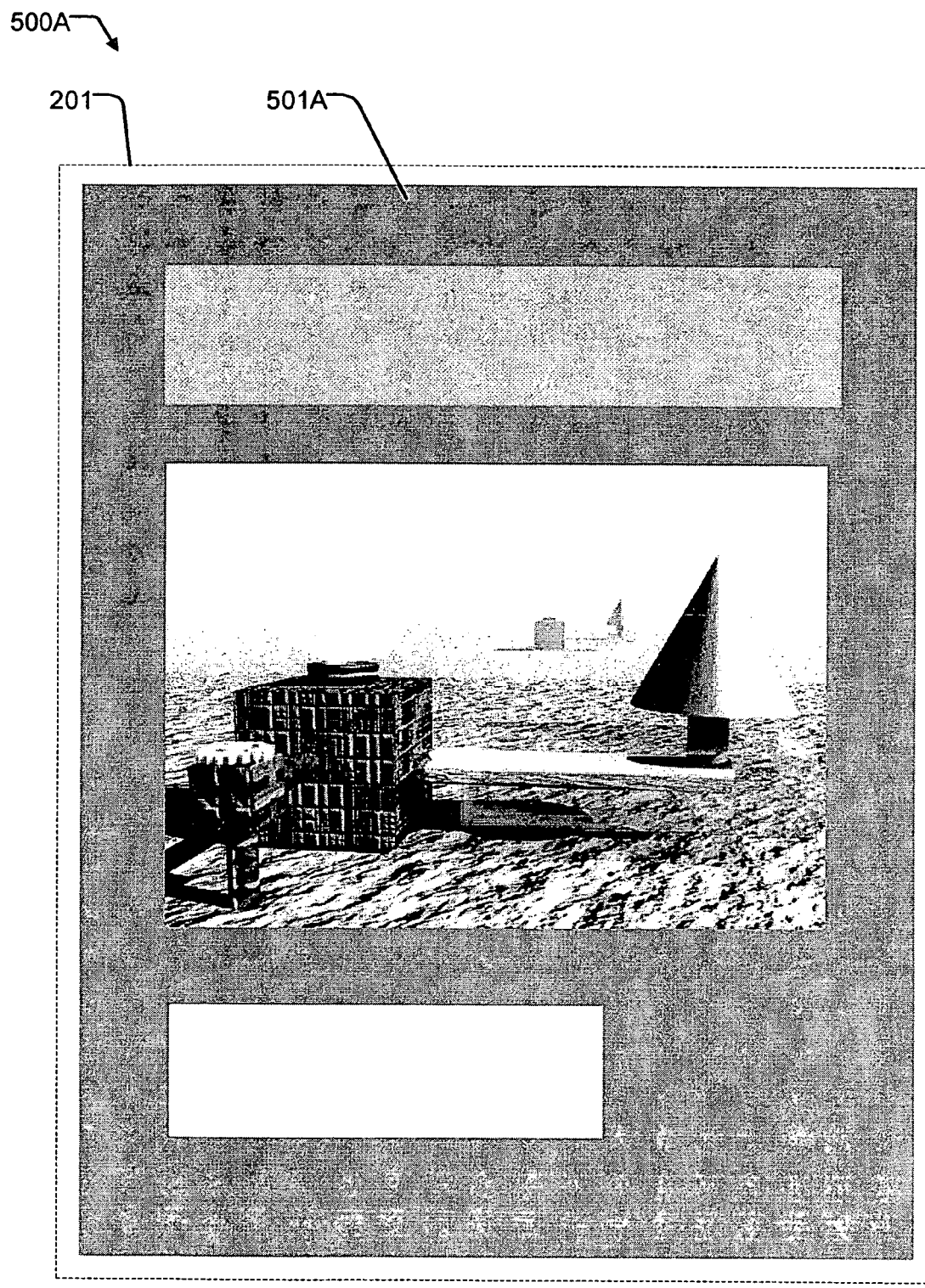
FIGS. 5A-5E illustrate exemplary image data produced by separately rendering common and variant content elements for one color separation according to the prior art.
Figure 5B:
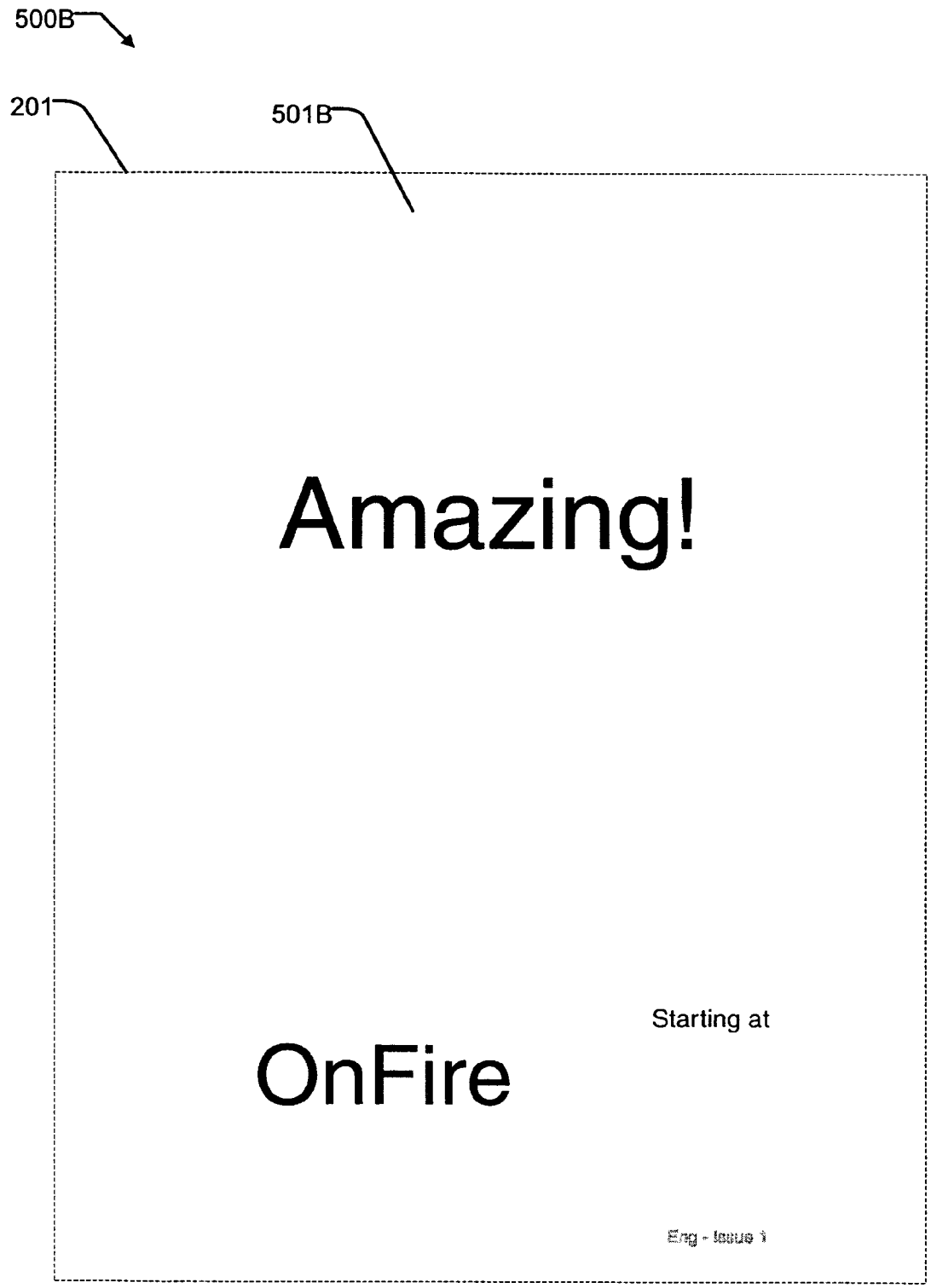
Figure 5C:
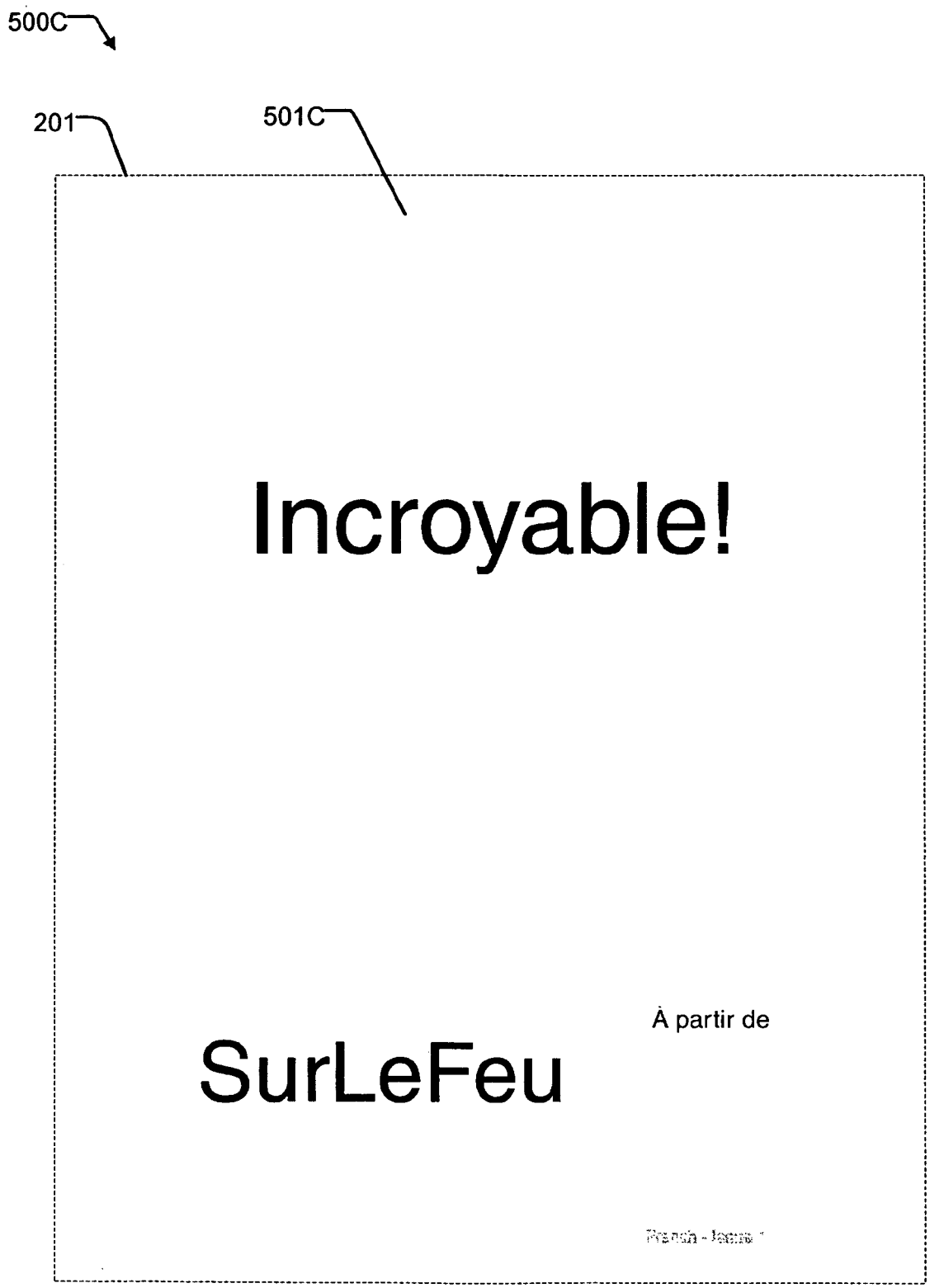
Figure 5D:
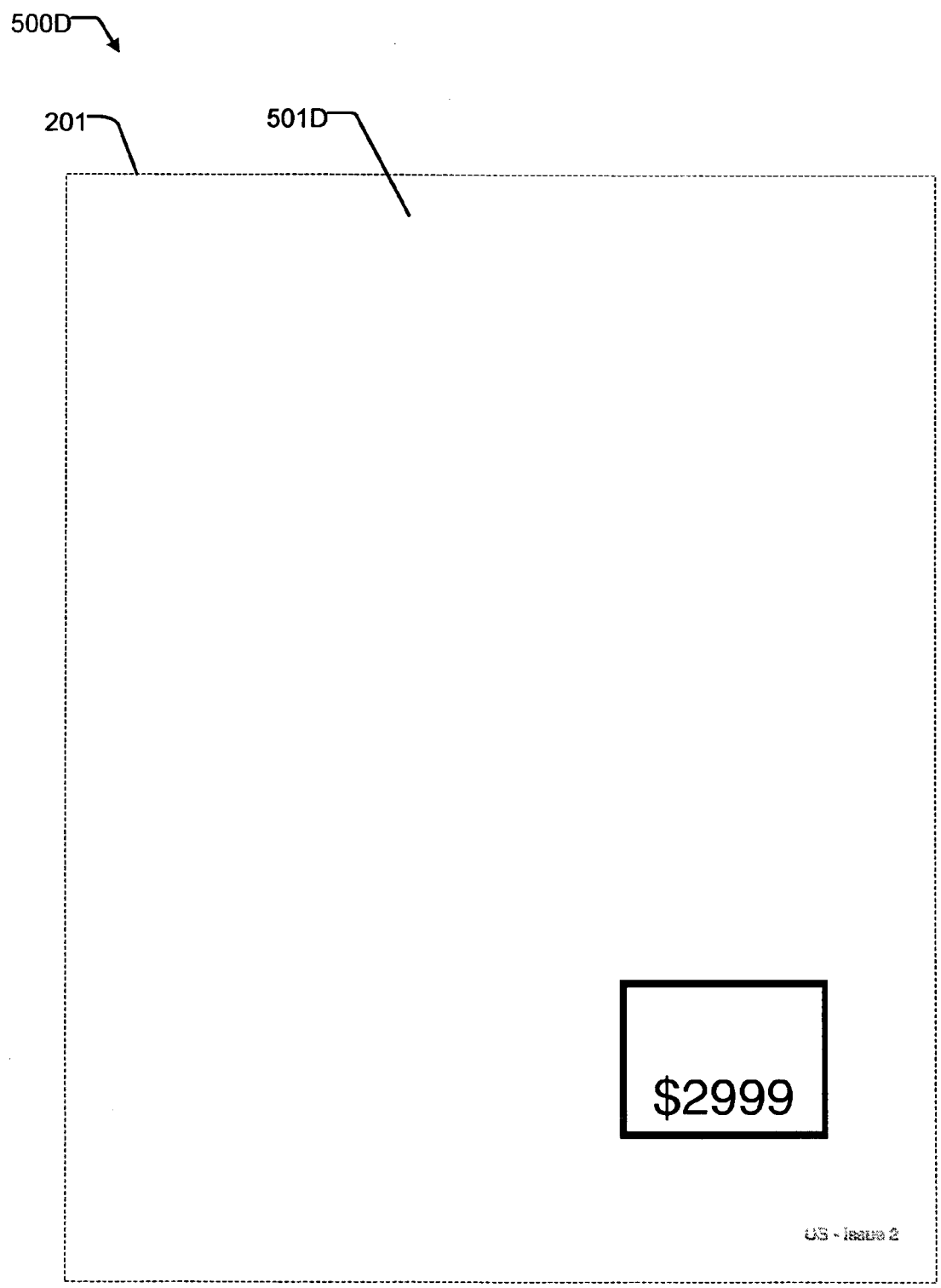
Figure 5E:
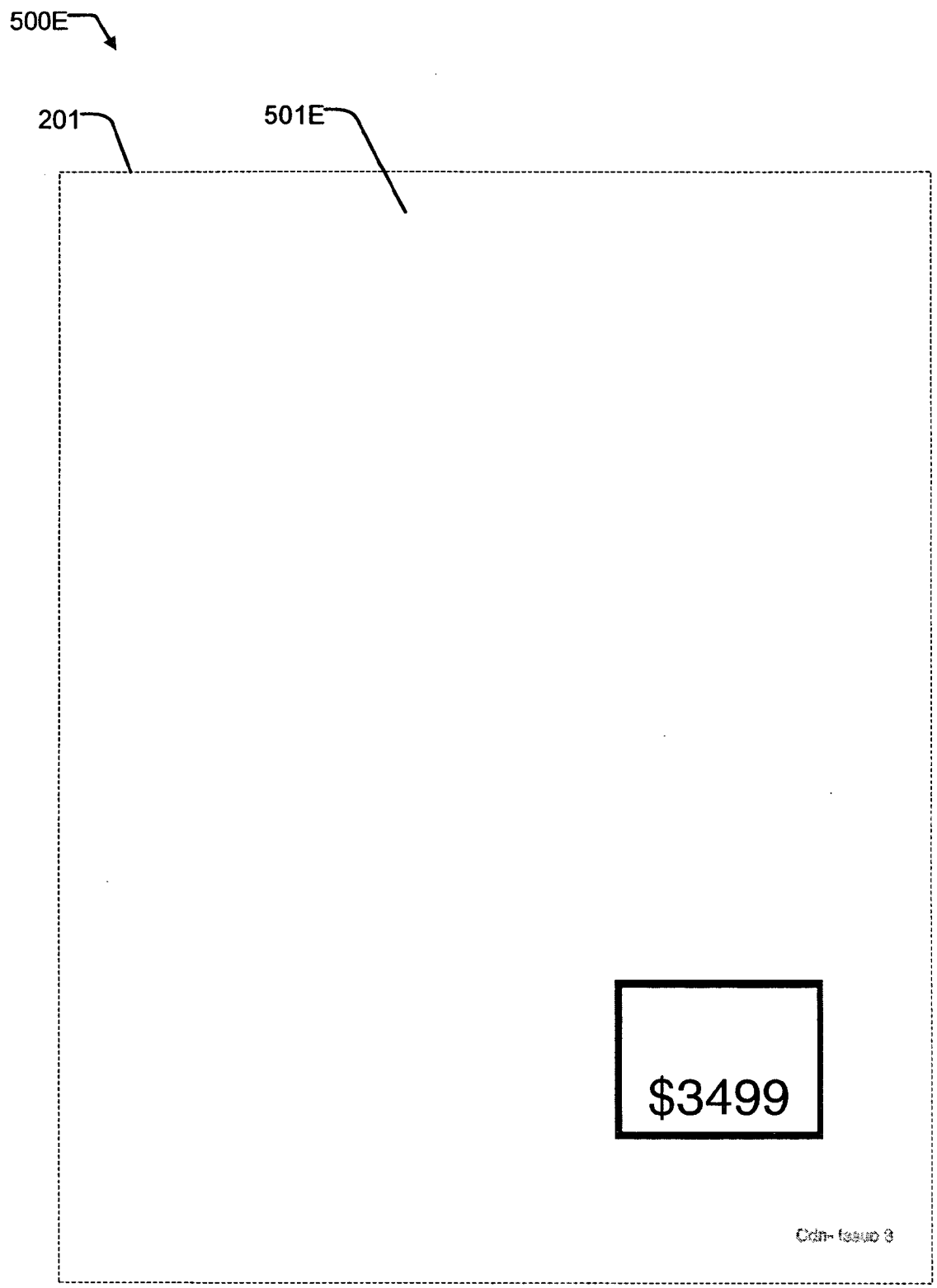

FIG. 5A illustrates an example of image data produced for the black color separation of common content elements 302-308. FIG. 5B illustrates an example of image data produced for the black color separation of English content elements 310-318. FIG. 5C illustrates an example of image data produced for the black color separation of French content elements 320-328. 5D illustrates an example of image data produced for the black color separation of US content elements 330-336. FIG. 5D illustrates an example of image data produced for the black color separation of Canadian content elements 340-346.

Figure 6:
FIG. 6 is a diagram illustrating a compositing of common and variant raster image data for one color separation according to the prior art.

FIG. 6 is a diagram illustrating a composite of common, English and US variant image data for the black color separation according to a raster workflow. Pixels 602 illustrate a 30% black tint. Common image data 501A paints pixels with 30% black tint (e.g. 30% black continuous tone at each pixel 602 or 30% of halftone pixels 602 enabled). English image data 501B and US image data 501D paint white pixels (e.g. 0% black tint). When composited with common image data 501A, pixels 602 paint black according to the image data 501A since it paints darker at that location.

Similarly, at pixels 603, common image data 501A paints 30% black tint whereas variant image data 501B and 501D paint 10% black tint. Therefore, composited pixels paint 30% black tint and production notes 240 do not appear in color-separated image 114 or color image 116.

Figure 7:
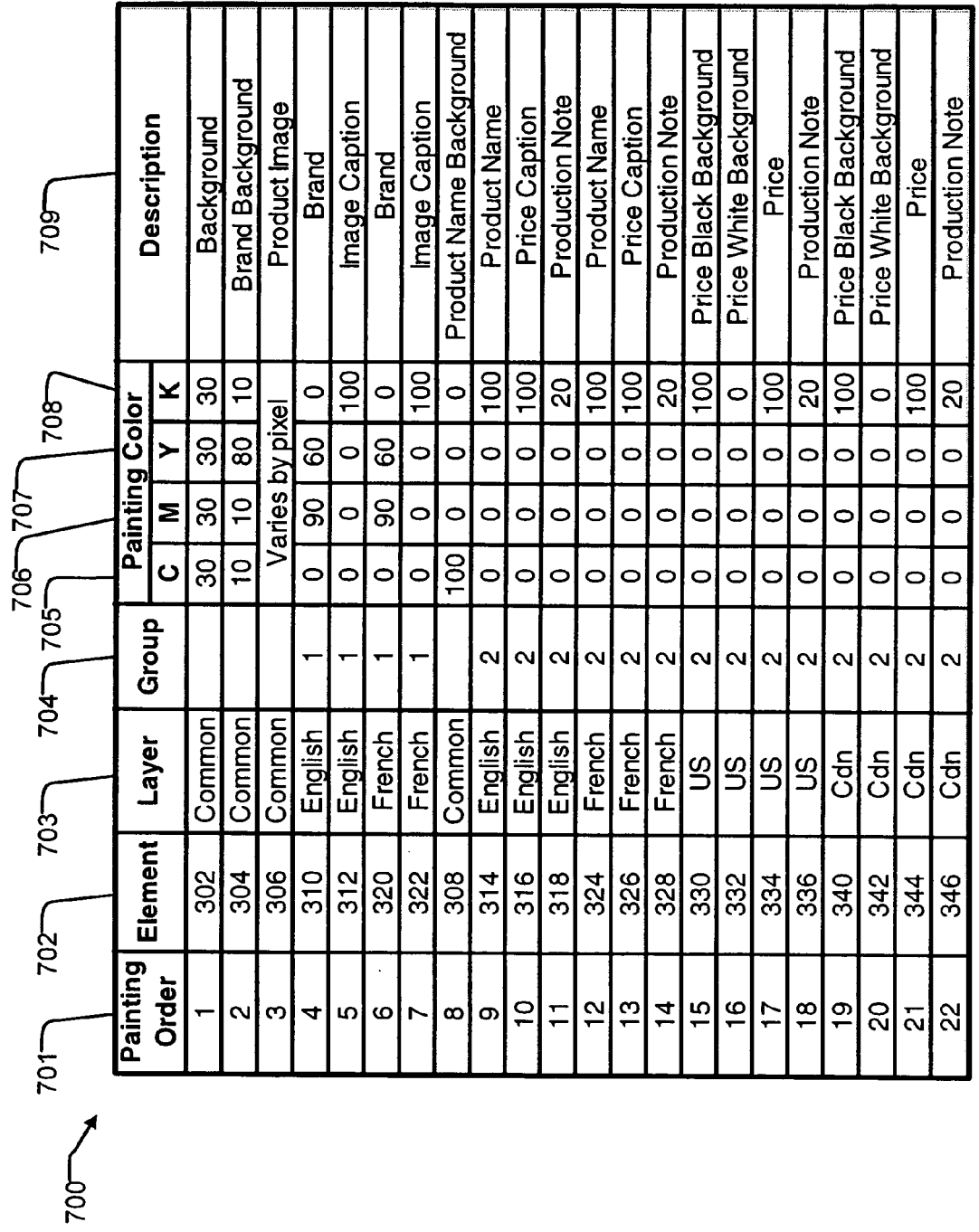
FIG. 7 illustrates the composition of an exemplary layered version document produced from an artwork document according to the invention.

FIG. 7 illustrates an exemplary composition of layered version document 108 produced from an example artwork document 104 according to the transparency processing aspect of the invention. Table 700 illustrates an ordered set of content elements configured in layered version document 108 according to painting order 701. Elements corresponding to artwork elements 302-346 are identified by element identity 702. For each element, the following information, configured for the element, is illustrated: a layer association 703; a transparency grouping 704; and a color 705-708. A description 709 is provided for contextual reference.

Thus, element 302 is configured to paint first and element 346 is configured to paint last. Note that common elements (e.g. 308) can be configured to paint after some variant elements.

Figure 8:
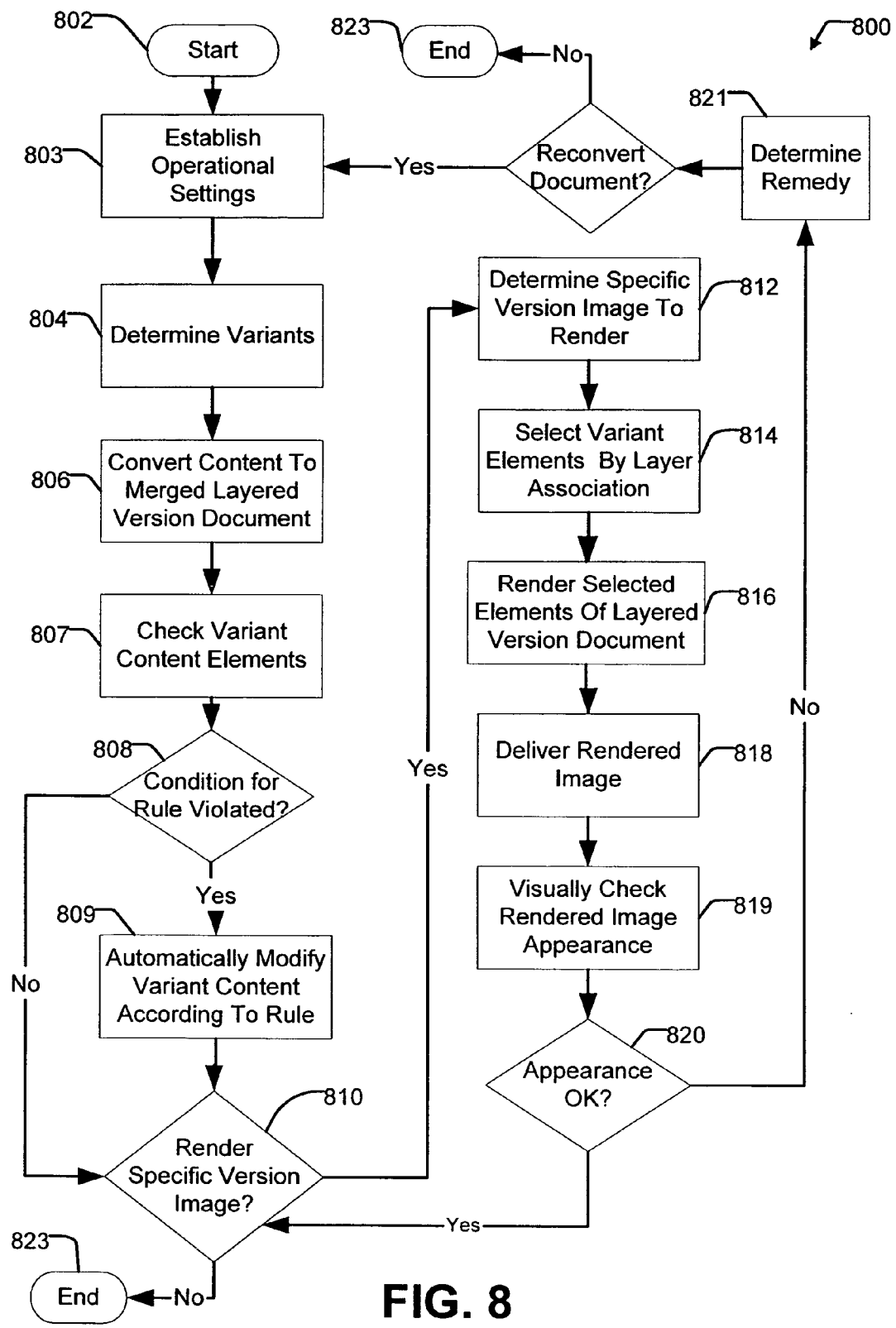
FIG. 8 is an exemplary flow chart diagram for producing, and rendering image data for a specific version of, a layered version document according to the invention.
Figure 9A:
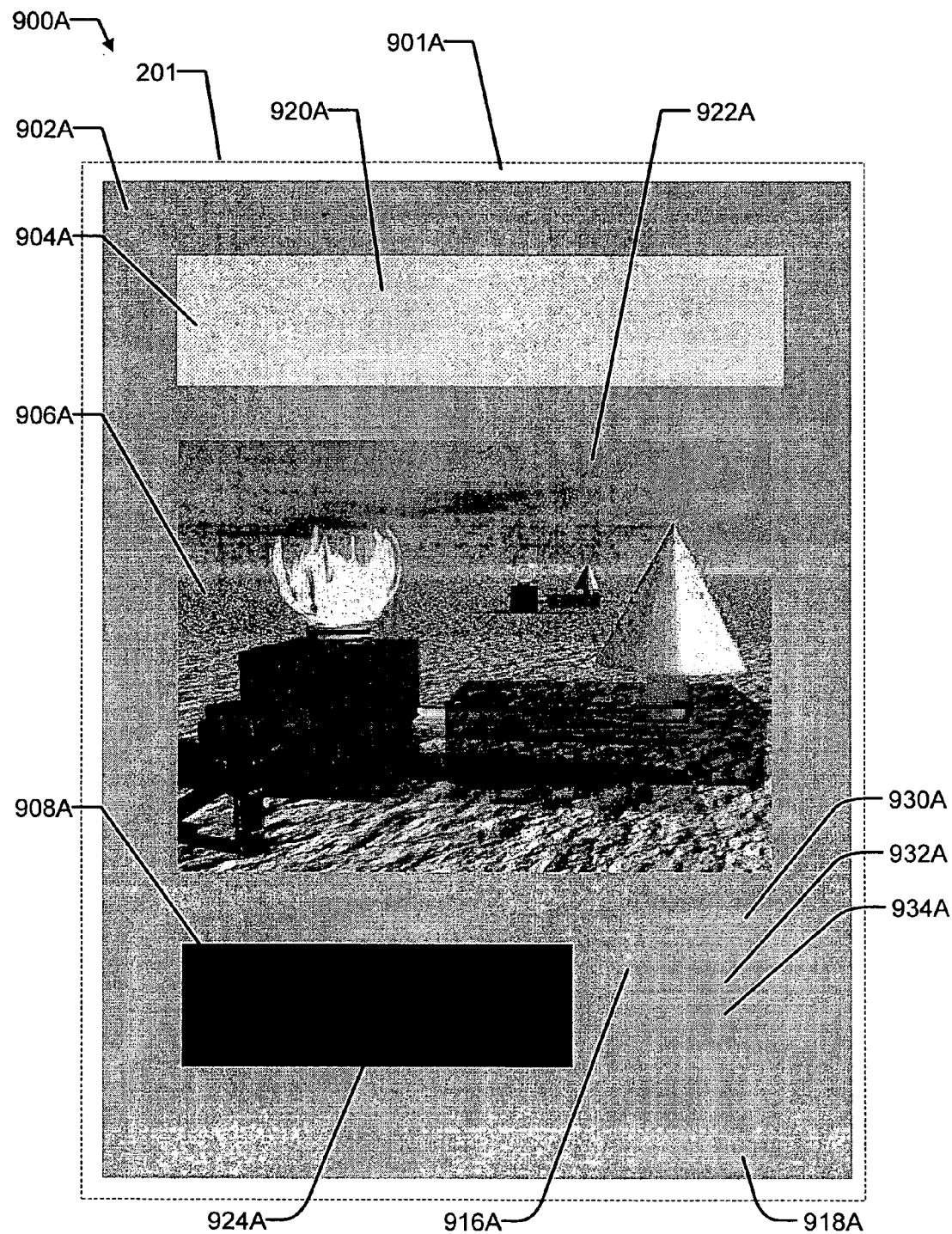
FIGS. 9A-9D illustrate exemplary color-separated image data produced by rendering a specific version of a layered version document with variant content reconfigured in transparency groups with a darken blend mode function according to the invention.
Figure 9B:
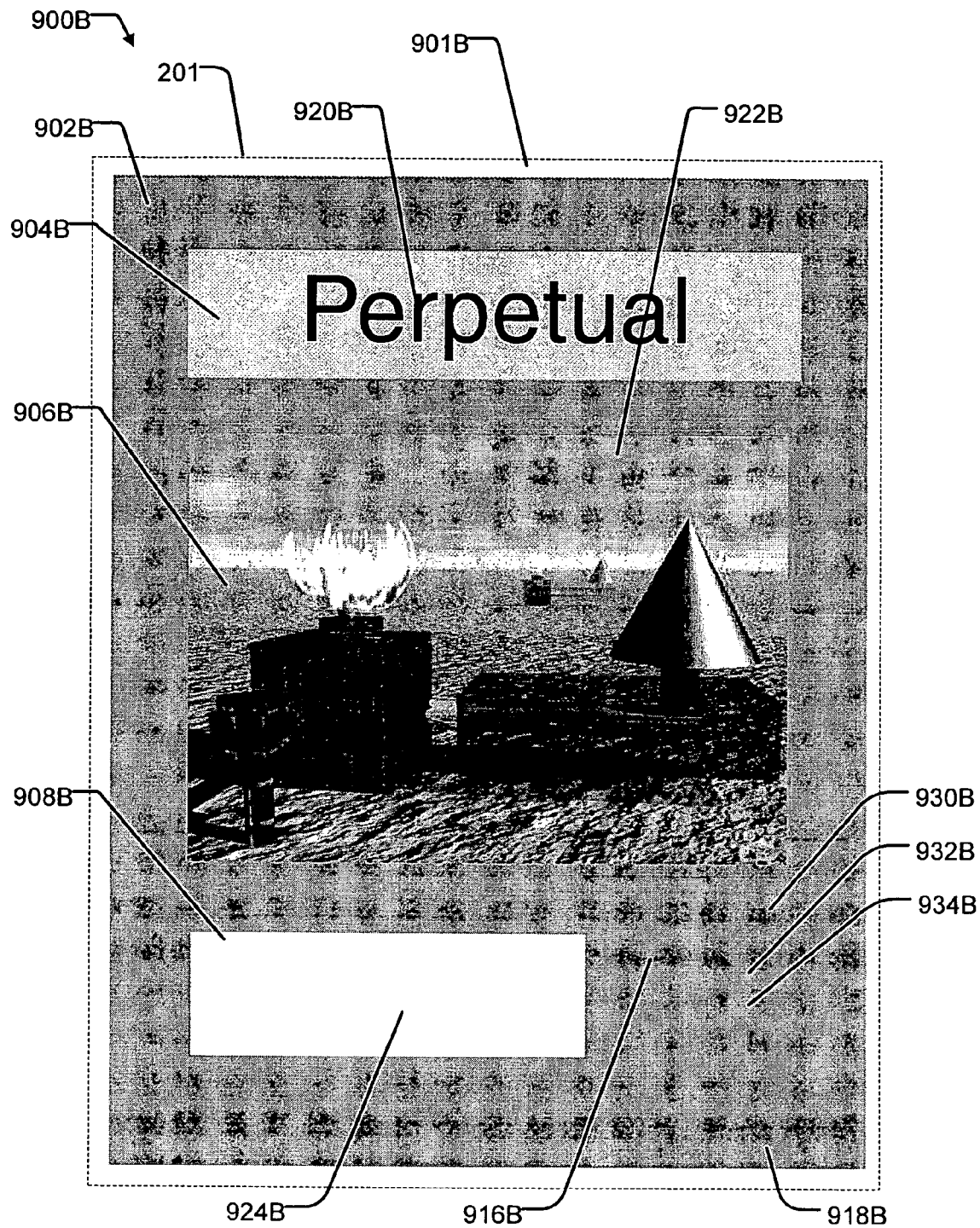
Figure 9C:
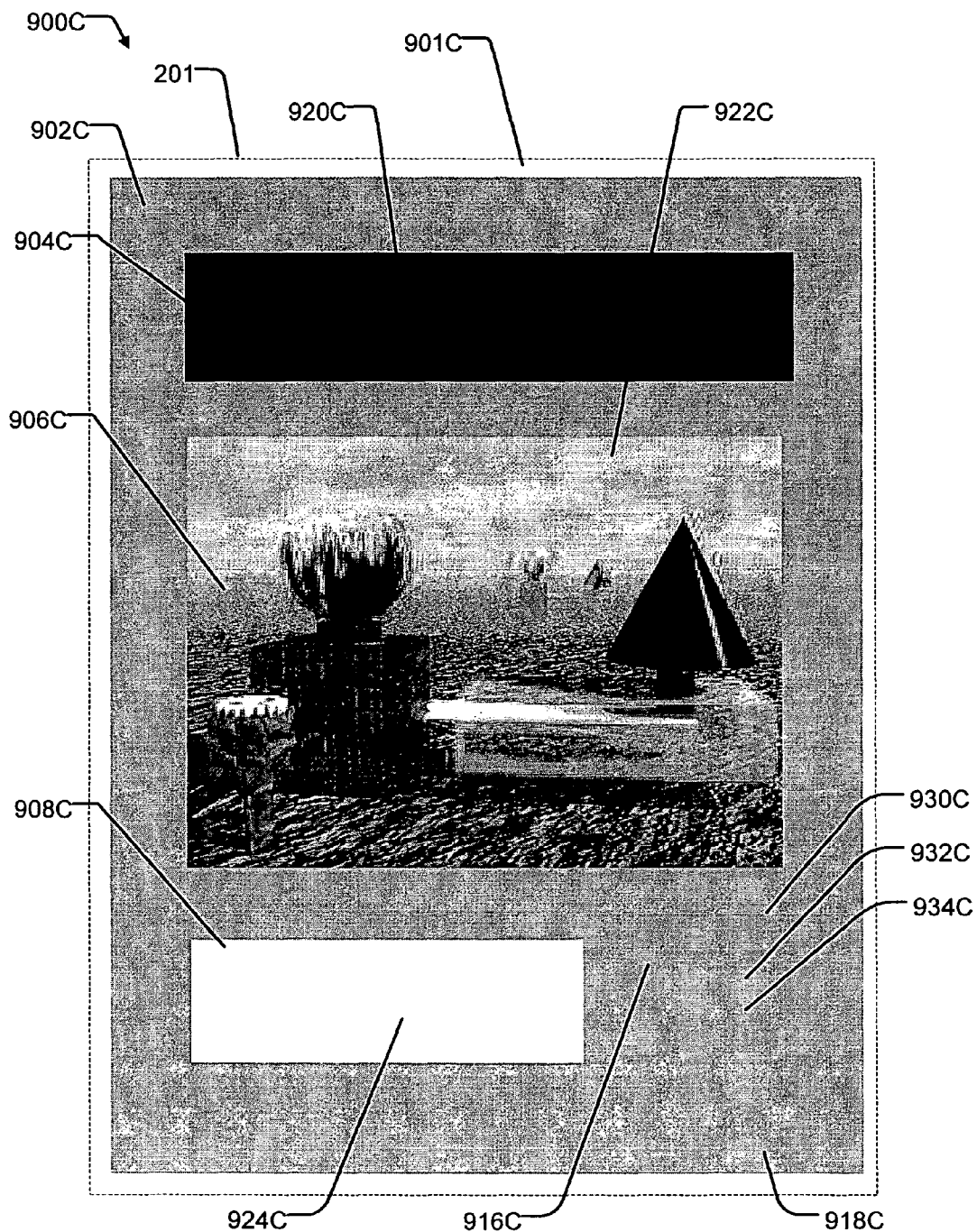
Figure 9D:
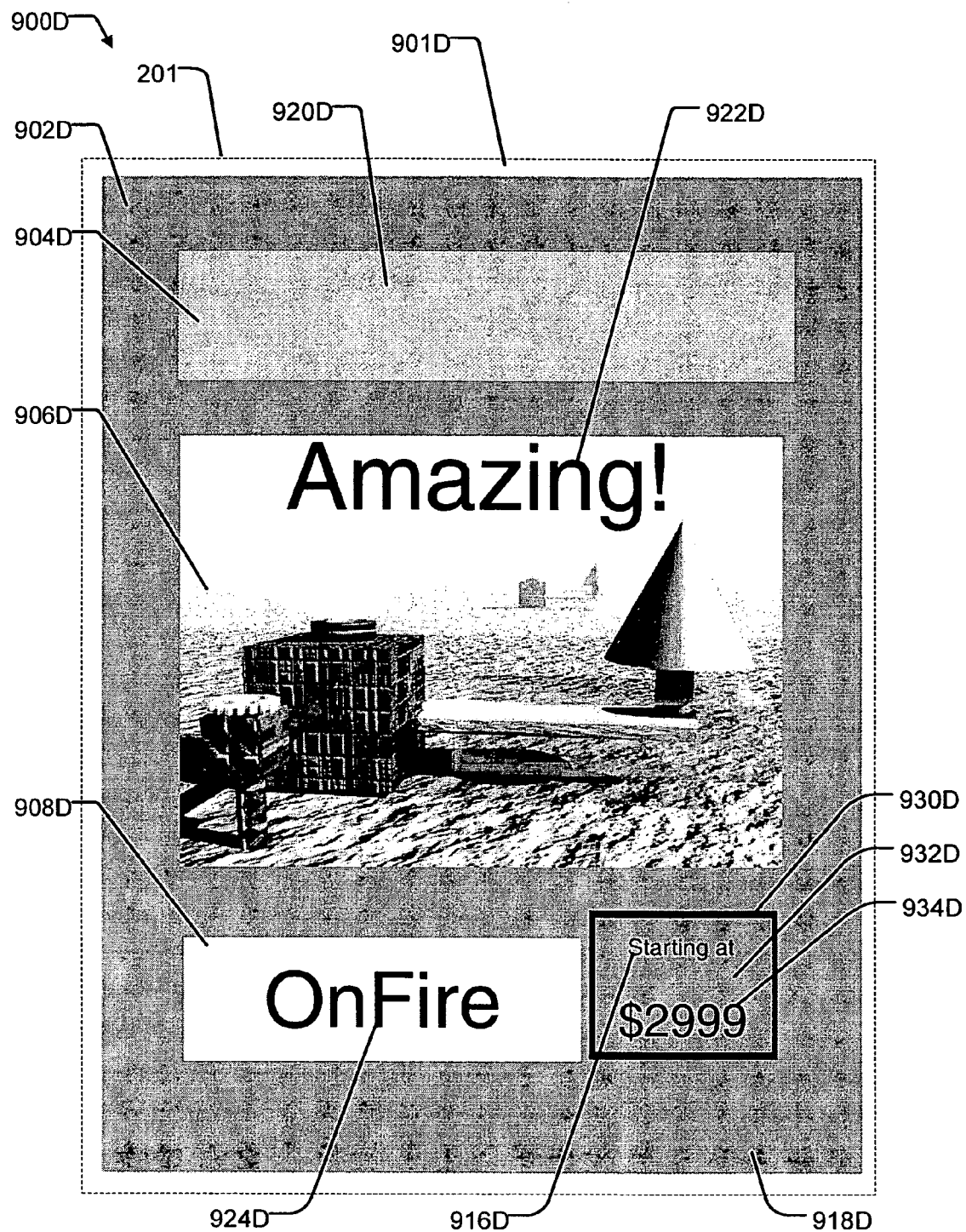
Figure 10A:
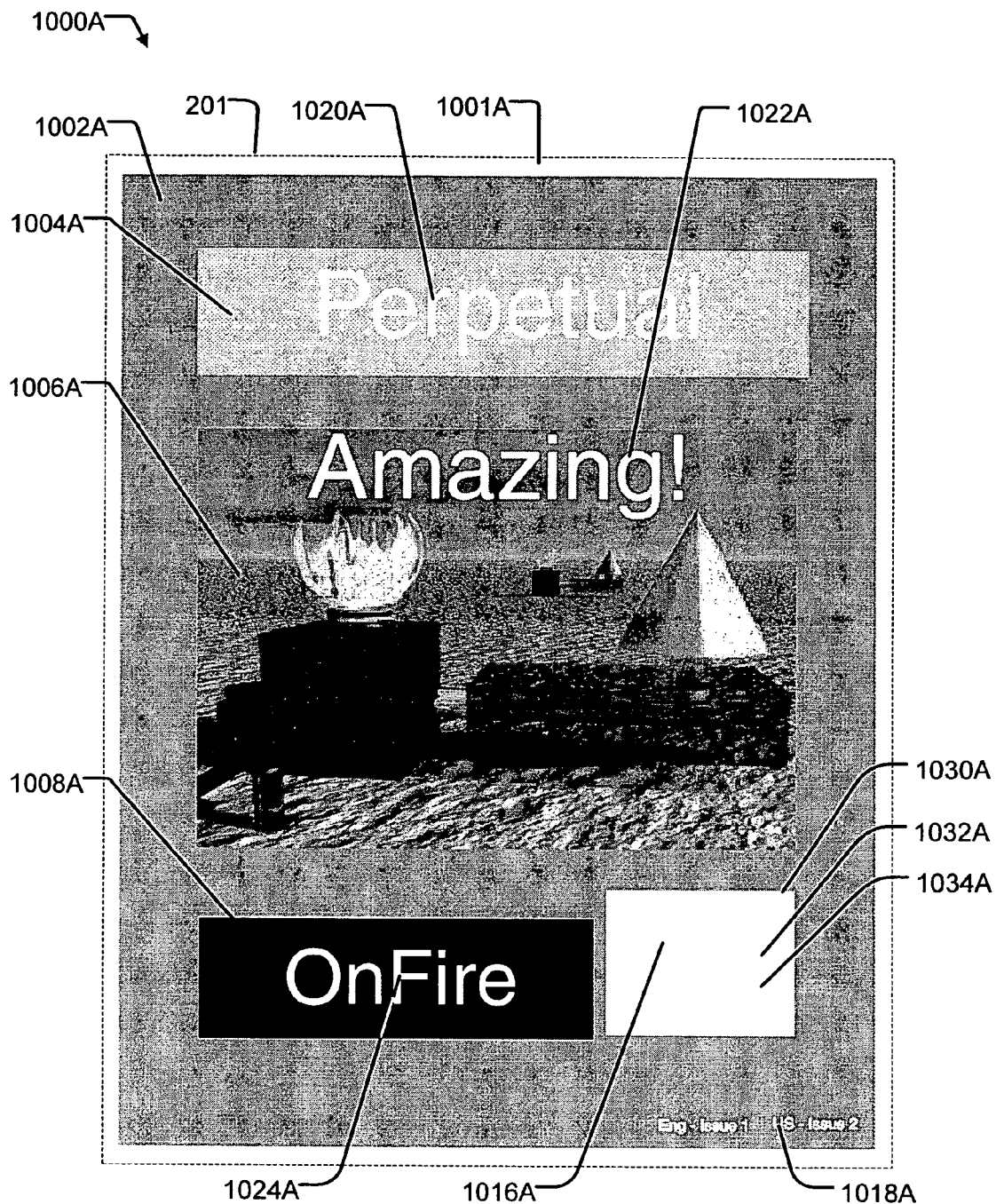
FIGS. 10A-10D illustrate exemplary color-separated image data produced by rendering a specific version of a layered version document, without benefit of the invention.
Figure 10B:
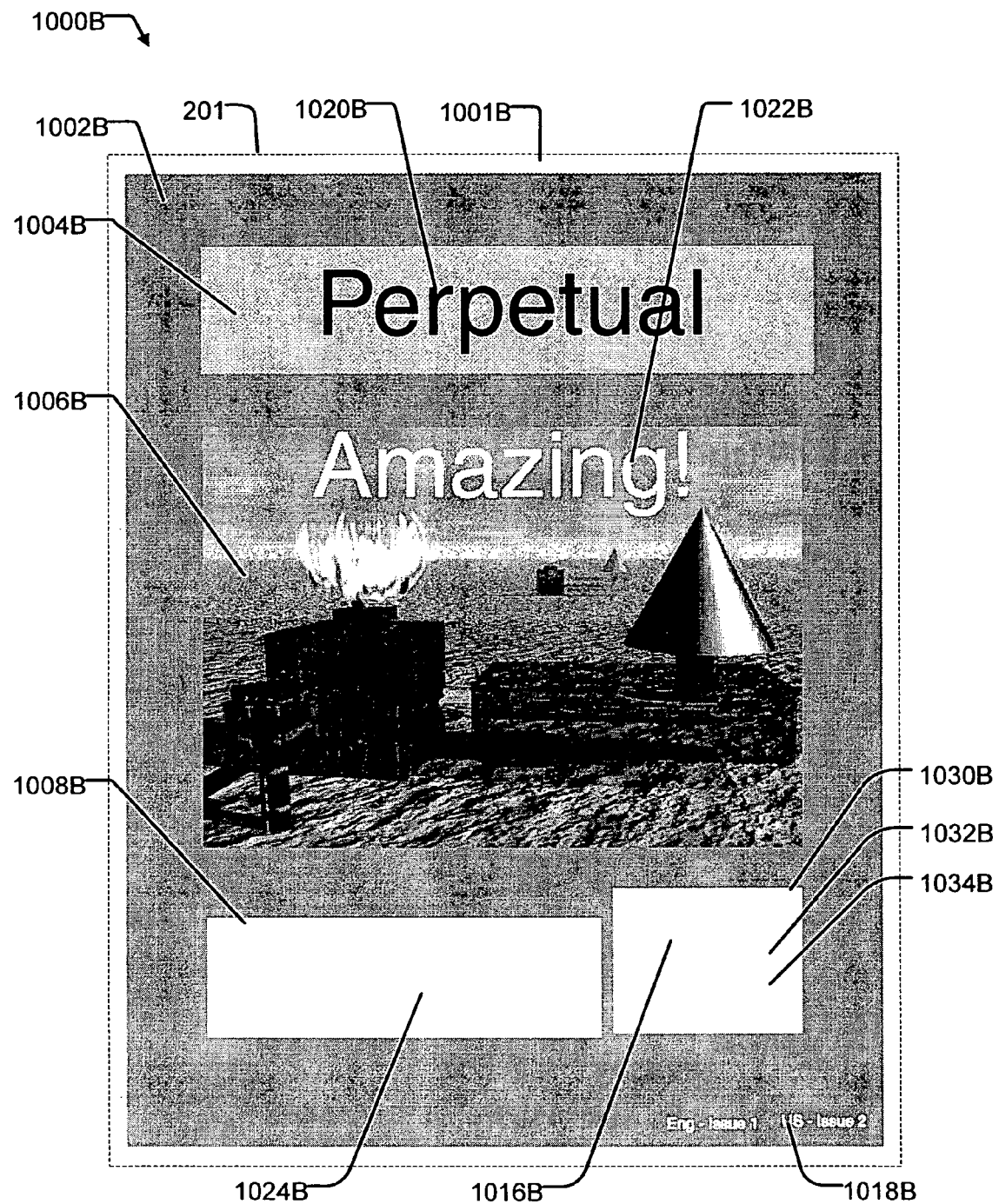
Figure 10C:
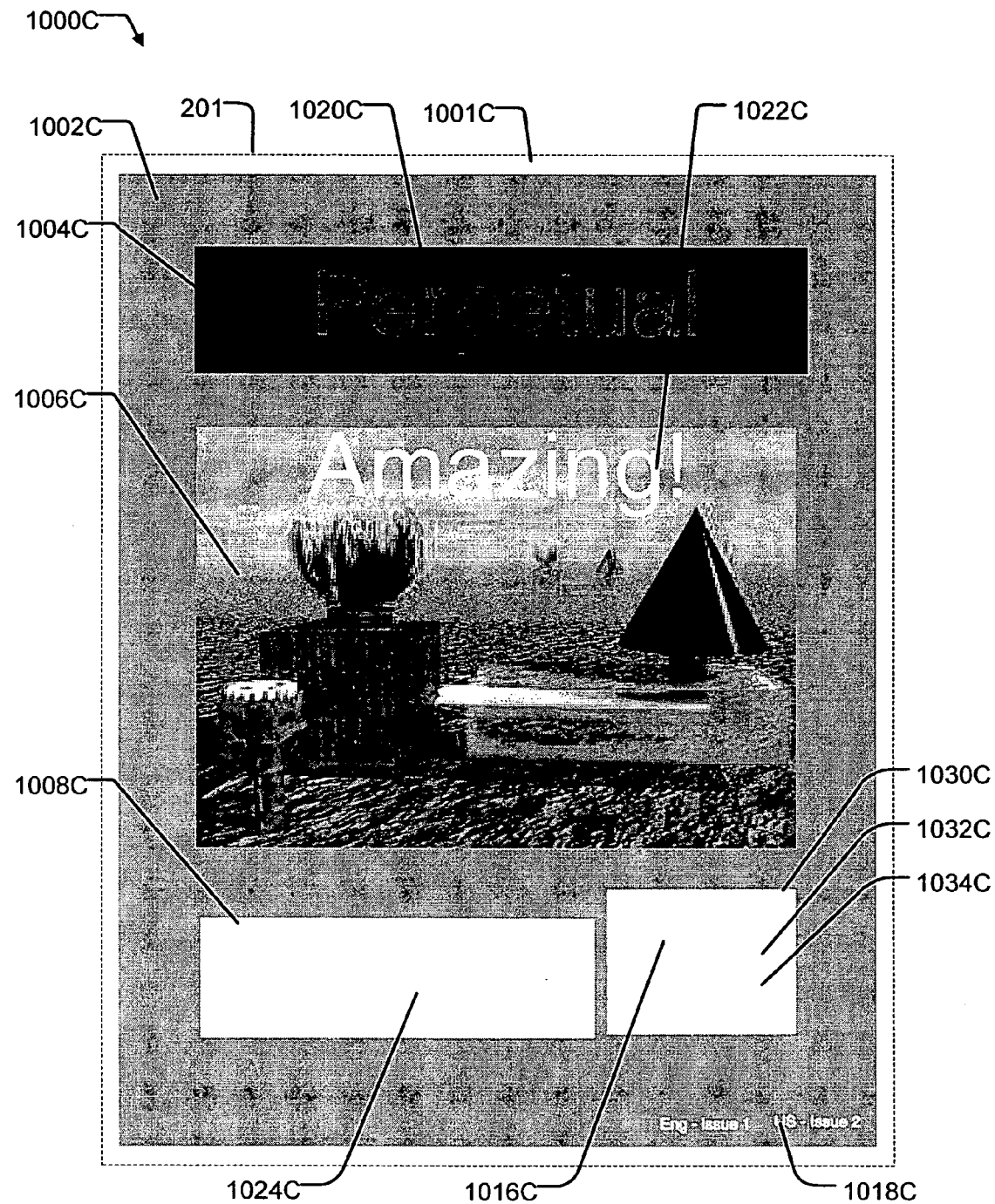
Figure 10D:
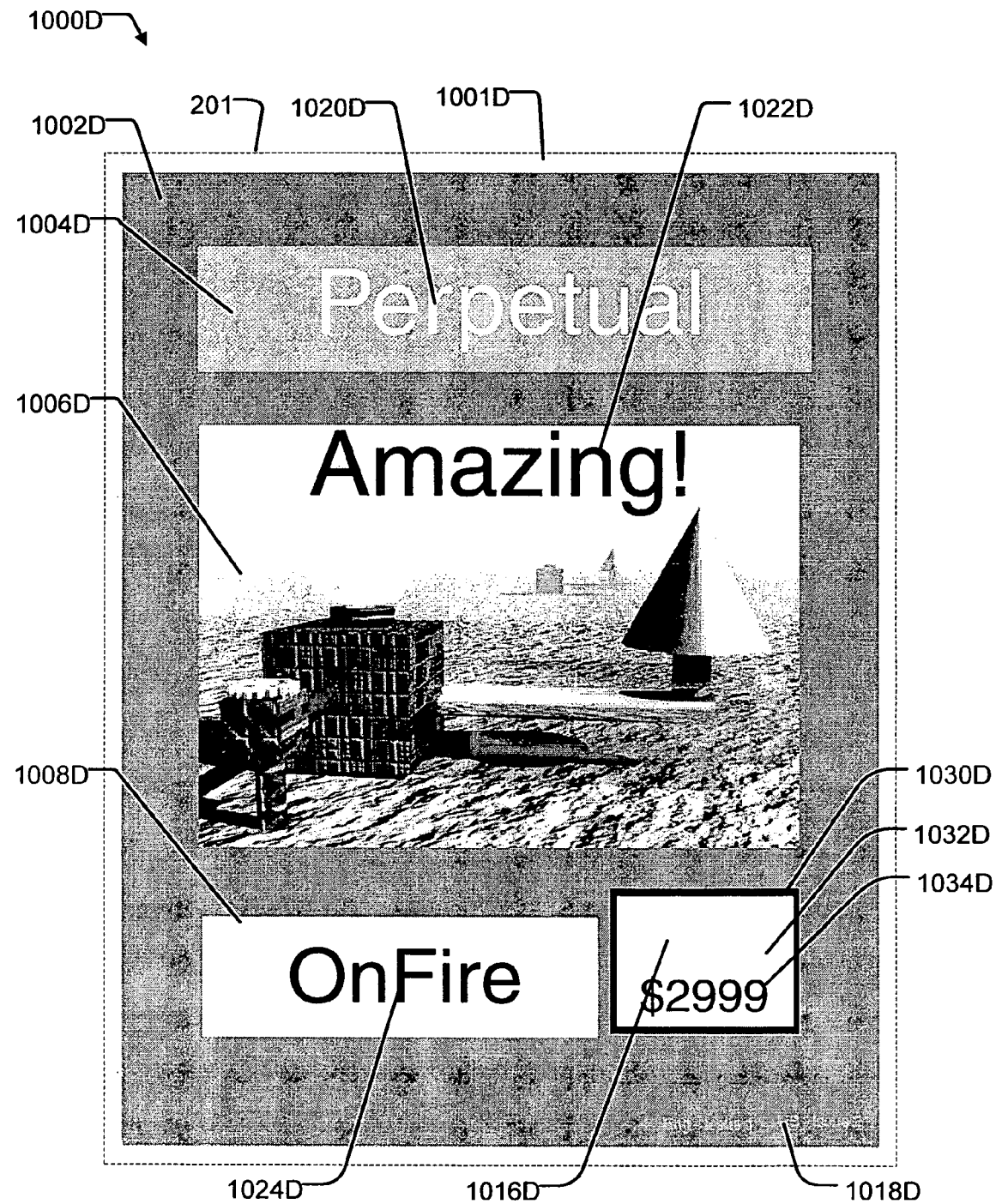

FIG. 8 is an exemplary flow chart diagram for producing and rendering image data for a specific version of layered version document 108 according to the invention. The method begins at block 802 with version document 107 and version intent 109 and proceeds to block 803 where operational settings are established, either as predefined settings or through input. Settings can identify conditions for which variant content should be checked. Settings can also identify which variant content modification rules to use. For example, in one preferred embodiment, one setting controls whether to check for variant content configured with a knockout intent and establishes a rule to automatically reconfigure the variant content with an overprint intent. As another example, one setting controls whether an unconditional rule is established to reconfigure variant content in transparency groups.

Proceeding at block 804 document converter 106 determines the set of variants in version document 107. This can be accomplished, for example, by examining files 402 or version intent 109.

Proceeding at block 806, document converter 106 uses the variant identities to configure common and variant layers for version document 108 from version documents 107. Conversion occurs for the type of version document 107 as described above to identify elements 302-346 and configure them with painting order 701, layer association 703, and target colors 705-708.

Proceeding at block 807 document converter 106 checks variant content for conditions established by settings in block 803. If a condition is violated by some variant content, converter 106 determines at block 808 whether a rule exists for the condition. If the rule's condition is violated the method proceeds to block 809. Otherwise the method proceeds to block 810. Note that unconditional rules proceed to block 809 unconditionally.

Proceeding at block 809, the method automatically modifies variant content according to the rule(s) whose condition(s) were violated. Note that FIG. 8 illustrates that conversion (806) precedes checking (807) and modification (809). In some circumstances, it may be desirable to check and modify variant content prior to conversion or it may be desirable to check both before and after conversion with modification order dependent on the rule.

As one example of a rule applied in block 809, document converter 106 associates variant content elements with transparency groups and configures the transparency groups to blend color using a darken blend mode function. Document converter 106 assigns variant content elements to groups according to their configured painting order and independent of their layer association. Successively painting variant content elements are associated with a group until a common content element is encountered. A new transparency group is formed for the next set of successively painting variant content elements found after an intervening common content element. Thus, in the example of FIG. 7, two transparency groups are identified, with elements 310-322 associated with the first group and elements 314-346 associated with the second group.

In some embodiments, transparency groups are created similar to the method described above but the groups of FIG. 7 are further subdivided by variant so that transparency processing is applied only to variant content from one variant at a time. For example, group 1 is divided into group 1A (elements 310 and 312) and 1B (elements 320 and 322) and so on.

At the end of block 809 layered version document 108 can be saved for later use and optionally rendered to produce image data for a specific version based on a decision at block 810. If no rendering is required, the method proceeds to block 823 and ends.

When rendering is desired, the method proceeds to block 812 where raster image processor 110 determines which specific version to produce based on an output request 111. For example, output request 111 can specify that a specific version corresponding to common, English and US layers is desired.

Proceeding at block 814, content elements are selected by raster image processor 110 for rendering by their association with layers selected by the output request 111. Then the method proceeds to block 816 where the selected content elements are rendered to a set of color-separated image data (e.g. one set of data with color intensity values for each pixel in the data or separate data for each color with one intensity value for each pixel). When rendering is complete, the method proceeds to block 818 where raster image processor 110 delivers the color-separated image data to target imaging device 112 or a storage facility for later use by device 112.

Proceeding at block 819 a user optionally performs a visual check to determine whether the rendered image violates any appearance conditions, often referred to as an undesirable appearance condition. For example, the user can check the image for variant content painting in a color separation intended only for common color. An image preview application (e.g. Adobe™ Acrobat™), for example, can support this activity by displaying color separated images 114 or color image 116 on imaging device 112 (e.g. a CRT display). The preview application can provide controls for selecting color separations and can provide controls for generating new image renderings to facilitate a more thorough review.

Proceeding at block 820 the user decides whether the rendered image violates any appearance condition (e.g. variant content painting a color intended for common content). If the appearance is acceptable, the method proceeds to block 810 where the user can decide whether any other renderings should be visually checked. If so, the method proceeds back to block 812 or otherwise proceeds to block 823 to end. If the appearance is not acceptable, the method proceeds to block 821.

Proceeding at block 821, the user determines a possible remedy for the unacceptable appearance of the rendered image. This could include manually making modifications to layered version document 108 or an ancestor document. This could also include changing settings for document converter 106.

Proceeding at block 822 the user determines if a document needs to be reconverted. If so, the method proceeds back to block 803 to reconvert a document to validate the potential remedy. Otherwise it proceeds to block 823 to end.

FIGS. 9A-9D illustrate exemplary color-separated image data produced by rendering a specific version (i.e. Common, English, and US layers) of layered version document 108 with variant content reconfigured into transparency groups configured to use a darken blend mode function according to the invention, FIGS. 10A-10D illustrate exemplary color-separated image data produced by rendering a specific version of layered version document 108, without the methods of the invention.

Black image data 901D produced according to the invention is visually similar to black image data 601 produced through a raster workflow method and thus achieves some of the benefits of the raster workflow method while retaining the benefits of the vector workflow method. Comparing aspects of corresponding figures amongst FIGS. 9A-D and 10A-D, illustrates some examples of undesirable rendered images caused by variant content and reduced by the invention.

For black image data 901D and 1001D, pixels 932D have a 30% black tint, consistent with background 202 of conceptual layout 200. Corresponding pixels 1032D have a 0% black tint resulting from element 332 knocking out color from element 330 (intended) and element 302 (unintended). Similarly, pixels 916D, corresponding to element 316, have an intended 100% black tint while pixels 1016D have an unintended 0% black tint caused by element 332. Pixels 918D have a 30% black tint, consistent with background 202 of conceptual layout 200. Pixels 1018D have a 10% black tint resulting from production note elements 318 and 336 knocking out color from background 302 (unintended).

Interestingly, pixels 920D, corresponding to brand 310, have a 30% black tint, inconsistent with brand 220 conceptual layout 200. In contrast, pixels 1020D have a 0% black tint, consistent with brand 220 of conceptual layout 200. This unintended impact may be relatively minor as the overprinted color caused by pixels 920D will be close to the artist's intent.

Identifying this type of impact, without a comparison can be difficult. Visual inspection of a preview image containing anti-elements (if they painted in other than common colorants) could be beneficial in identifying this type of impact. Visual inspection could also facilitate identifying a more serious impacts caused when variant content elements, configured with knockout intent and without benefit of transparency processing, unexpectedly affect a common color separation (e.g. cyan of our example). Pixels 924A in FIG. 9A, corresponding to element 314, have a 100% cyan tint, inconsistent with conceptual layout 200 but actually desirable. Pixels 1024A in FIG. 10A have a 0% cyan tint. Pixels 1024A are consistent with conceptual layout 200 but are inconsistent with version intent 109 (cyan color for common content only) and are also undesirable. Product names 314 (English) and 324 (French), when configured to knockout would, in the prior art, knockout different pixels in the cyan image. In a prior art preview of the exemplary specific version (e.g. 1001A), pixels 1024A may appear correct even though they are inconsistent with version intent 109. It is easy, especially with a complex image, to recognize variant content in the rendered image. In a preview including anti-elements, image data would also include knockouts caused by the anti-element corresponding to (French) element 324 and thus would be easy to spot.

Figure 11:
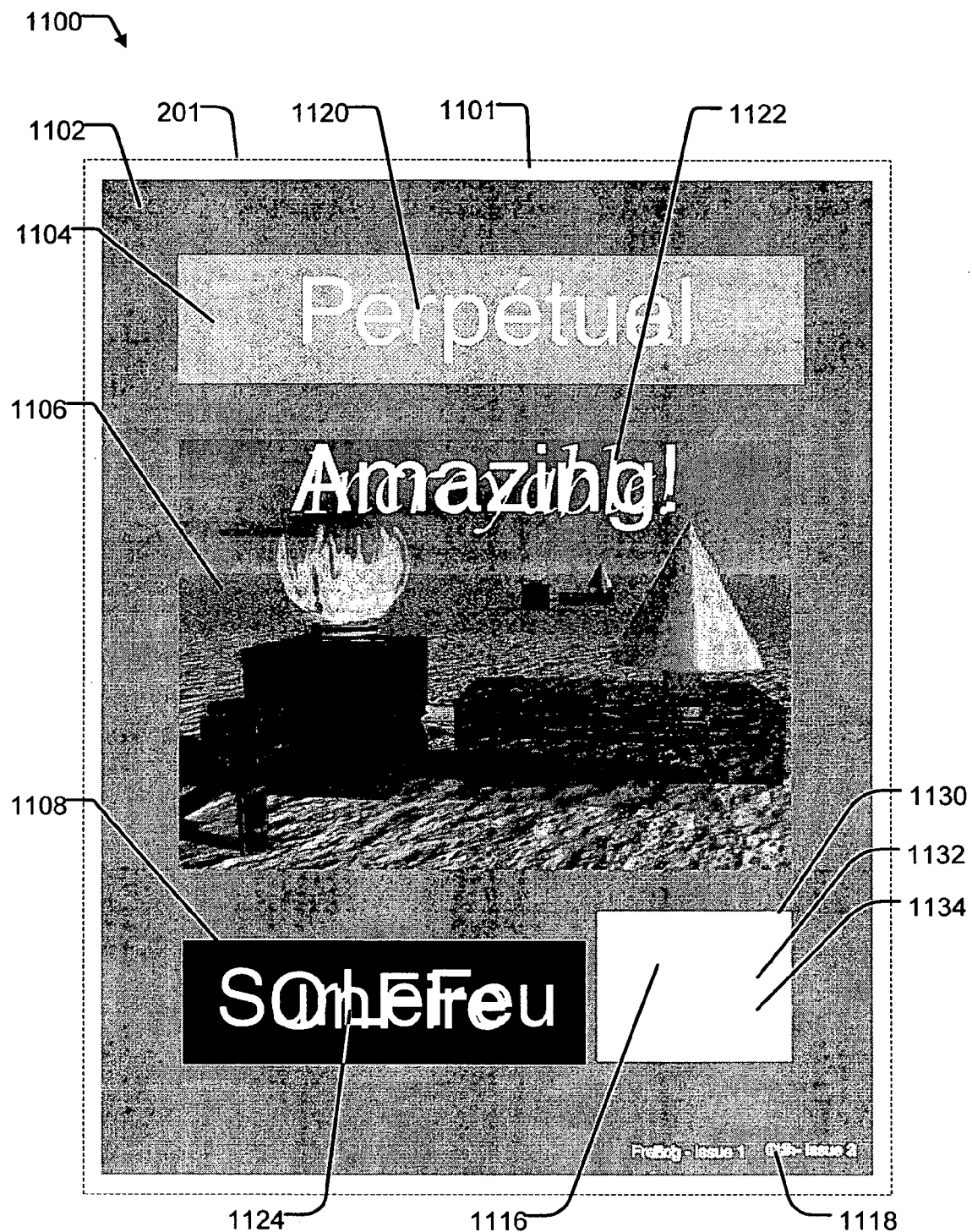
FIG. 11 illustrates an exemplary preview image for a common color separation produced by rendering a specific version of a layered version document with content added to facilitate visually checking whether some variant content has an undesirable appearance according to the invention.

FIG. 11 illustrates an exemplary preview image for the common (cyan) color separation produced by rendering a specific version of layered version document 108 with content added to facilitate visually checking whether some variant content has an undesirable appearance according to the invention. Preview image 1101 has been produced with the anti-French and anti-Canadian layers selected automatically as a result of not selecting the French and Canadian layers. The anti-English and anti-US layers have been automatically deselected as a result of selecting the English and US layers.

In the example of FIG. 11, original French element 324 results in a text anti-element with value "SurLeFeu", configured to paint only in the black colorant and with zero intensity with overprint intent. The "SurLeFeu" anti-element is configured to paint after common element 306 but before element 324 and is associated with the anti-French layer. The "SurLeFeu" anti-element is selected in a preview image when the French layer is unselected. As an alternative, the anti-French layer can be configured to be selected only when the Common layer is selected and the French layer is unselected. Other anti-layers and automatic selection rules may also be useful for identifying potential impacts.

Comparing cyan preview image 1101 with cyan target image 1001A (without anti-elements) illustrates exemplary problems that can be detected. For example, pixels 1118, 1120, 1122, and 1124 illustrate some different and common areas of cyan color knocked out by English variant elements and overprinted by French anti-elements. The lack of commonality in the cyan separation is not as readily apparent in image 1001A. Upon inspecting the preview image, the user may decide the correct course of action. Exemplary courses of action could be to reconfigure variants to paint with overprint or to reconfigure variants in transparency groups with darken blend mode processing.

Automatically reconfiguring variant content to use overprint intent would produce image data similar to FIGS. 1A-10D since each variant is configured to paint in each colorant. If variant elements had also been modified to refrain from painting in common colorants, then the cyan color separation could have been more desirable (similar to FIG. 9A). However, rendering of price caption 316 in the black color separation would still have been undesirable since it paints before background elements 330 and 332. Additionally, production notes 318 and 336 would still be present in the black image data.

Thus, in the example, reconfiguring variant content in transparency groups configured with a darken blend mode function (illustrated in FIGS. 9A-9D) is a preferred method for automatically reducing the undesirable impact of variant content on the rendered image.

Certain implementations of the invention comprise computer processors, which execute software instructions, which cause the processors to perform a method of the invention. For example, creative application 102, document converter 106, and/or raster image processor 110 causes computer systems to operate according to the methods described above. The program product may comprise any medium which carries a set of computer-readable signals comprising instructions which, when executed by a computer processor, cause the computer processor to execute a method of the invention. The program product may be in any of a wide variety of forms. The program product may comprise, for example, physical media such as magnetic storage media including floppy diskettes, hard disk drives, optical data storage media including CD ROMs, DVDs, electronic data storage media including ROMs, flash RAM, or the like or transmission-type media such as digital or analog communication links. The instructions may optionally be compressed and/or encrypted on the medium.

The invention has been described in detail with particular reference to certain preferred embodiments thereof, but it will be understood that variations and modifications can be effected within the spirit and scope of the invention.

The invention claimed is:

1. A method for processing a document, the method comprising:
   selecting common and variant content from the document wherein the variant content includes content for a plurality of variants;
   automatically converting the common and variant content into a layered version document;
   checking whether some variant content violates one or more conditions;
   automatically modifying the some variant content in response to the condition(s) being violated;
   wherein the condition further comprises a condition that could cause a rendering of the document to violate an undesirable appearance condition;
   wherein the condition comprises painting a color intended only for common content; and
   wherein automatically modifying the some variant content comprises associating the some variant content with an error layer of the layered version document.

2. A method for processing a document, the method comprising:
   selecting common and variant content from the document wherein the variant content includes content for a plurality of variants;
   automatically converting the common and variant content into a layered version document;
   checking whether some variant content violates one or more conditions;
   automatically modifying the some variant content in response to the condition(s) being violated;
   wherein the condition further comprises a condition that could cause a rendering of the document to violate an undesirable appearance condition;
   wherein the condition further comprises painting with a knockout intent; and
   wherein automatically modifying the some variant content comprises reconfiguring the some variant content to paint with an overprint intent.

3. A method for processing a document, the method comprising:
   selecting common and variant content from the document wherein the variant content includes content for a plurality of variants;
   automatically converting the common and variant content into a layered version document;
   checking whether some variant content violates one or more conditions;
   automatically modifying the some variant content in response to the condition(s) being violated;
   wherein the condition further comprises a condition that could cause a rendering of the document to violate an undesirable appearance condition;

wherein the condition further comprises painting with a knockout intent;

wherein automatically modifying the some variant content comprises adding variant content to the layered version document based on the some variant content;

wherein automatically adding variant content to the layered version document based on the some variant content comprises:

adding a variant anti-element for each original variant element configured with a knockout intent wherein adding comprises adding a copy of the original variant element;

configuring the anti-element to paint before the original variant dement and to paint an absence of color with an overprint intent for a color intended only for common content; and associating the anti-element with an anti-layer based on the variant layer associated with the original variant element wherein the anti-layer is automatically selected when the corresponding variant layer is unselected.

4. A method for processing a document, the method comprising:

selecting common and variant content from the document wherein the variant content includes content for a plurality of variants;

automatically converting the common and variant content into a layered version document;

checking whether some variant content violates one or more conditions;

automatically modifying the some variant content in response to the condition(s) being violated;

wherein the condition further comprises a condition that could cause a rendering of the document to violate an undesirable appearance condition;

wherein the condition further comprises painting with a knockout intent;

wherein automatically modifying the some variant content comprises adding variant content to the layered version document based on the some variant content;

visually checking whether variant content violates an appearance condition;

wherein visually checking whether variant content violates an appearance condition comprises:

selecting a plurality of layers of the layered version document;

rendering preview image data by rendering content dements associated with the selected layers;

checking whether variant elements violate an appearance condition; and wherein checking whether variant elements violate an appearance condition comprises checking the appearance of visible anti-elements in conjunction with visible variant elements for a color intended only for common content.

5. An apparatus for processing a document, the apparatus including a computer processor to execute a document converter which completes steps to:

select common and variant content from the document wherein the variant content includes content for a plurality of variants;

automatically convert the common and variant content into a layered version document;

including the capability to:

check whether some variant content violates a condition;

automatically modify the some variant content in response to the condition being violated;

wherein the condition comprises a condition that could cause a rendering of the document to violate an undesirable appearance condition;

wherein the condition comprises painting with a knockout intent;

wherein the capability to automatically modify some variant content comprises a capability to add variant content to the layered version document based on the some variant content;

wherein the capability to add variant content to the layered version document includes capabilities to:

add a variant anti-element for each original variant element configured with a knockout intent wherein adding comprises adding a copy of the original variant element;

configure the anti-element to paint before the original variant element and to paint an absence of color with an overprint intent for a color intended only for common content; and associate the anti-element with an anti-layer based on the variant layer associated with the original variant element wherein the anti-layer is automatically selected when the corresponding variant layer is unselected.

6. A system for processing a document, the system comprising:

means for selecting common and variant content from the document wherein the variant content includes content for a plurality of variants;

means for automatically converting the common and variant content into a layered version document;

including:

means for checking whether some variant content violates a condition;

means for automatically modifying the some variant content in response to the condition being violated;

wherein the condition comprises a condition that could cause a rendering of the document to violate an undesirable appearance condition;

wherein the condition comprises painting with a knockout intent;

wherein means for automatically modifying the some variant content comprises means for adding variant content to the layered version document based on the some variant content;

wherein means for automatically adding variant content to the layered version document based on the some variant content comprises:

means for adding a variant anti-element for each original variant element configured with a knockout intent wherein means for adding comprises means for adding a copy of the original variant element;

means for configuring the anti-element to paint before the original variant element and to paint an absence of color with an overprint intent for a color intended only for common content; and means for associating the anti-element with an anti-layer based on the variant layer associated with the original variant element wherein the anti-layer is automatically selected when the corresponding variant layer is unselected.

* * * * *